Nov. 26, 1935.　　　A. G. BELDEN ET AL　　　2,022,178
HYDRAULICALLY OPERATED AUTOMATIC CAM GRINDING MACHINE
Filed April 16, 1932　　　18 Sheets-Sheet 1
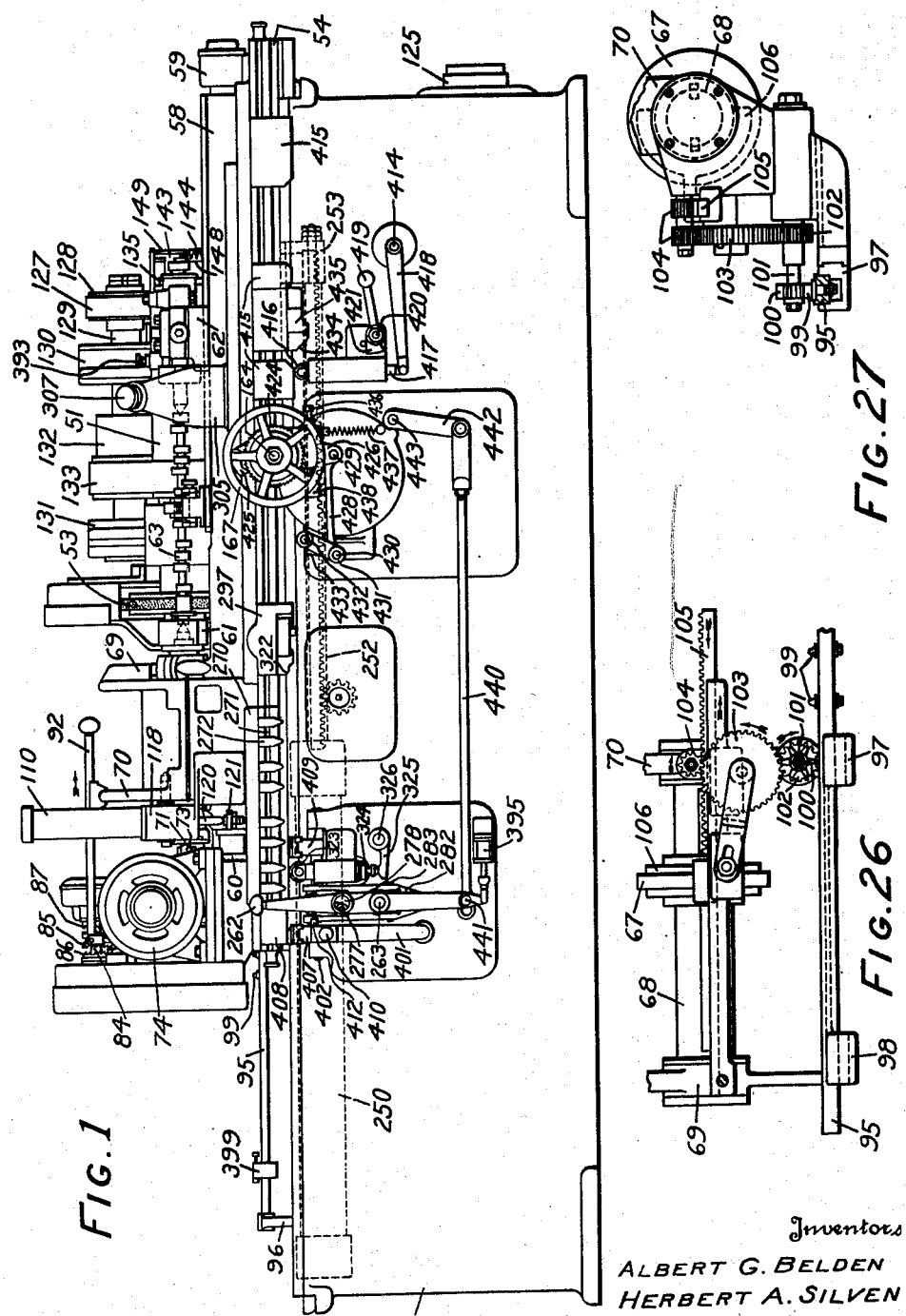
Inventors
ALBERT G. BELDEN
HERBERT A. SILVEN
By Clayton L. Jenks
Attorney
WITNESSES
Franklin E. Johnson
Harold W. Eaton Nov. 26, 1935.  A. G. BELDEN ET AL  2,022,178
HYDRAULICALLY OPERATED AUTOMATIC CAM GRINDING MACHINE
Filed April 16, 1932  18 Sheets-Sheet 2
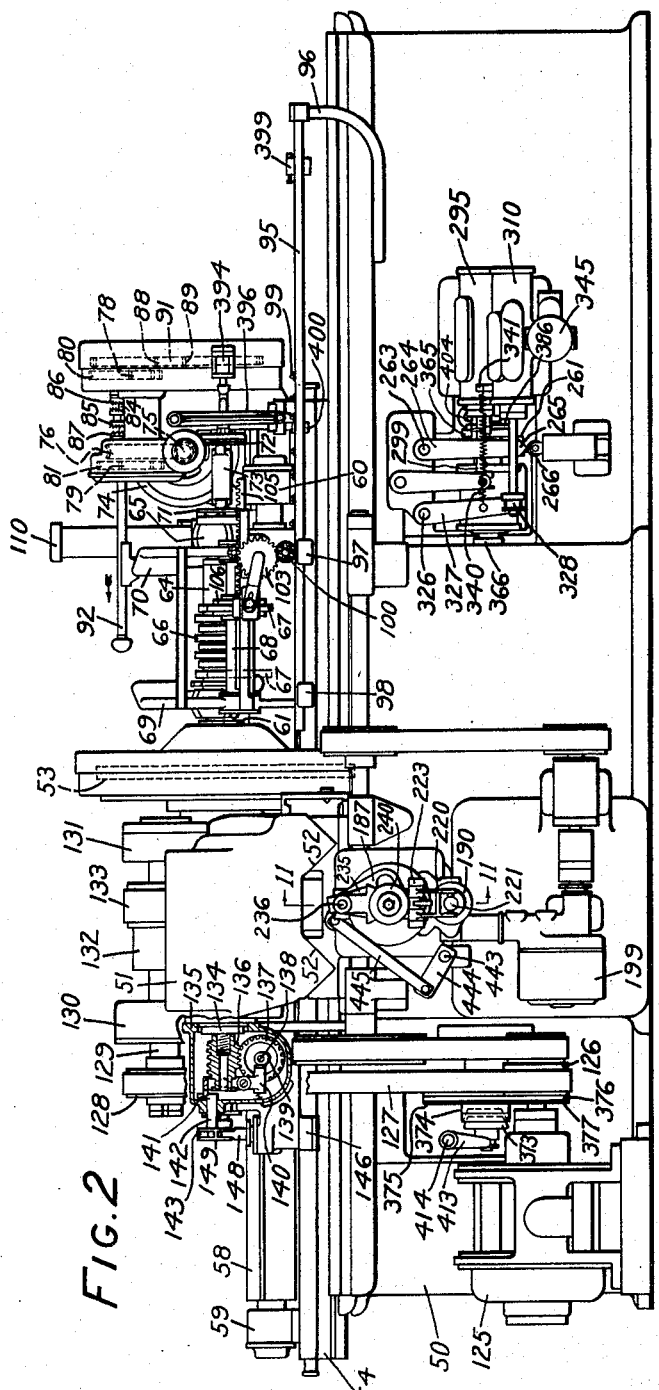
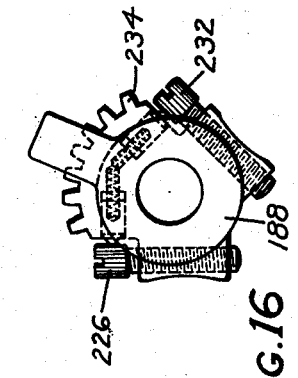
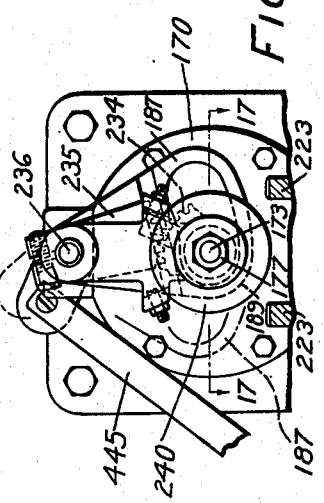
Inventors
ALBERT G. BELDEN
HERBERT A. SILVER
By Clayton R. Jenks
Attorney Nov. 26, 1935.  A. G. BELDEN ET AL  2,022,178
HYDRAULICALLY OPERATED AUTOMATIC CAM GRINDING MACHINE
Filed April 16, 1932   18 Sheets-Sheet 3
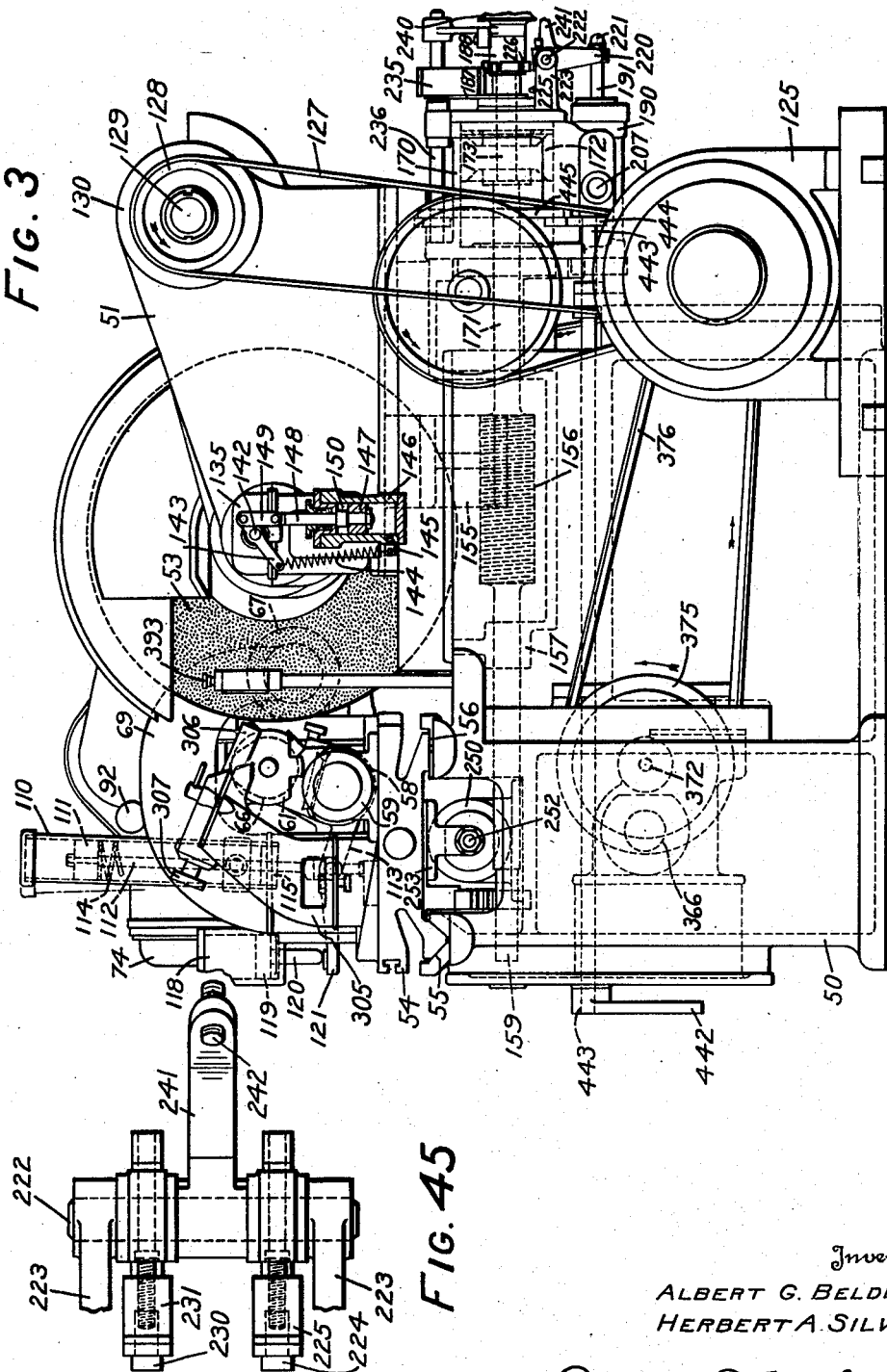
Inventors
ALBERT G. BELDEN
HERBERT A. SILVEN
By Clayton L. Jenks
Attorney
WITNESSES
Franklin E. Johnson
Harold W. Eaton

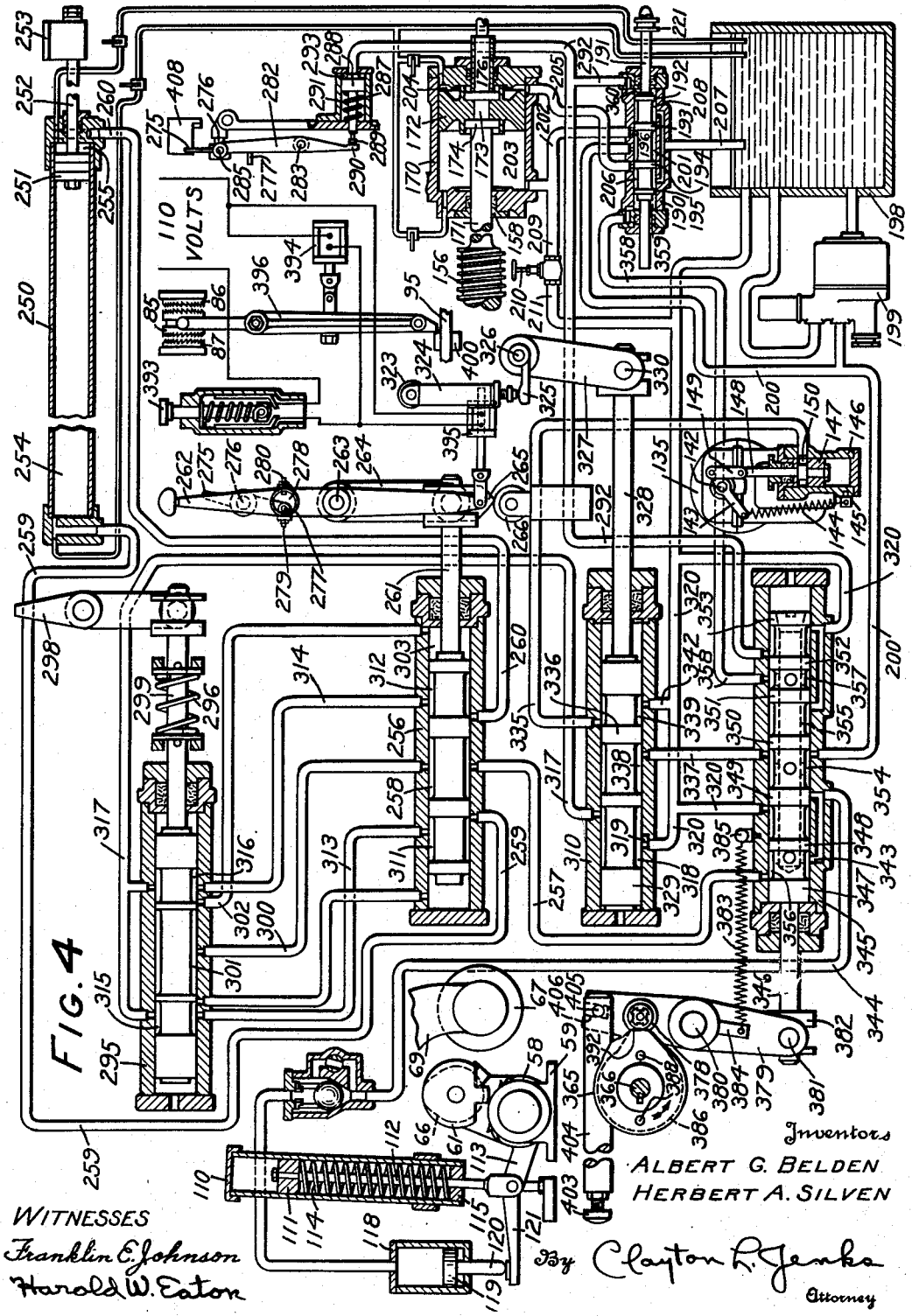

Nov. 26, 1935.  A. G. BELDEN ET AL  2,022,178
HYDRAULICALLY OPERATED AUTOMATIC CAM GRINDING MACHINE
Filed April 16, 1932  18 Sheets-Sheet 5
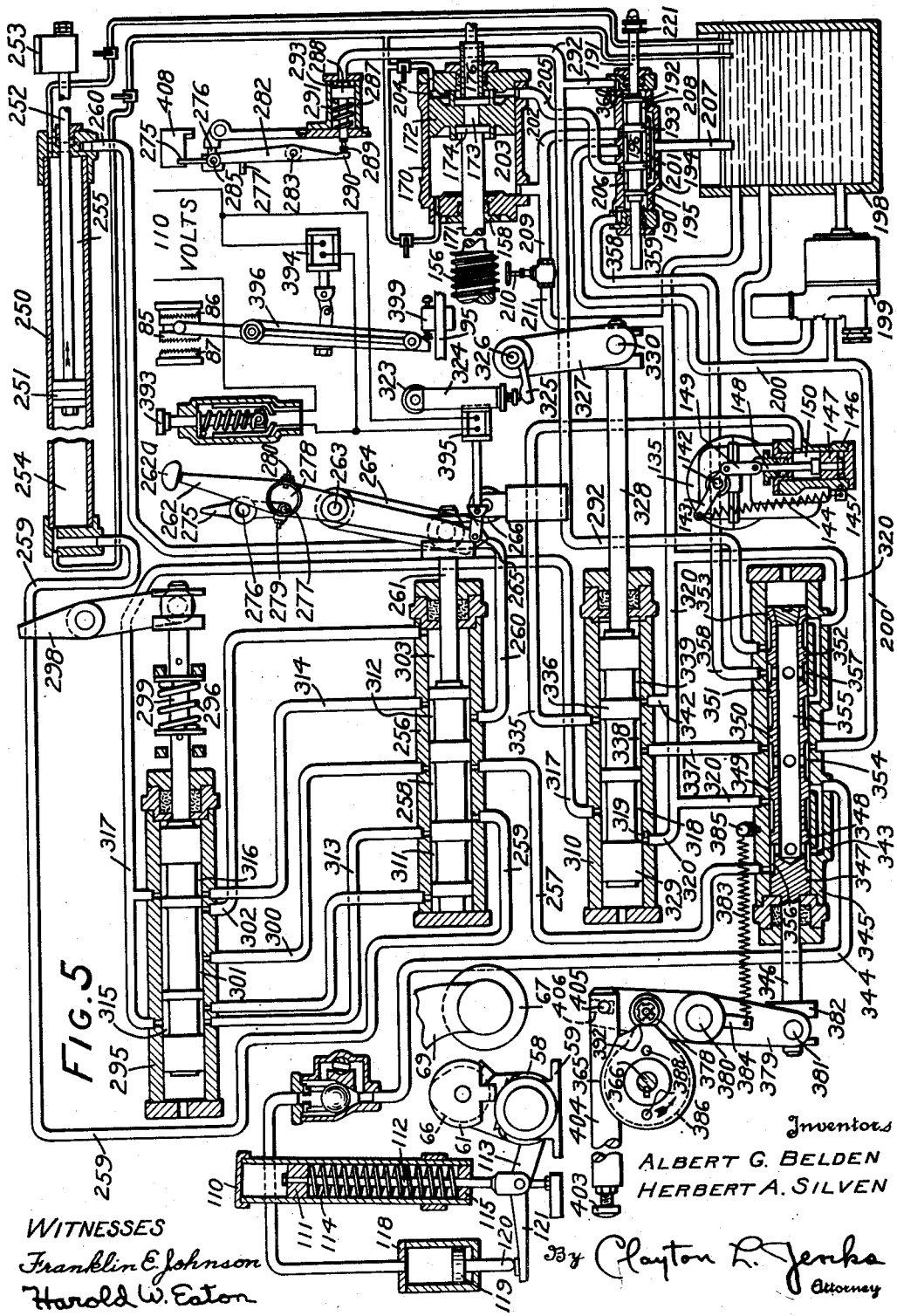
Inventors
ALBERT G. BELDEN
HERBERT A. SILVEN
By Clayton L. Jenks
Attorney
WITNESSES
Franklin E. Johnson
Harold W. Eaton

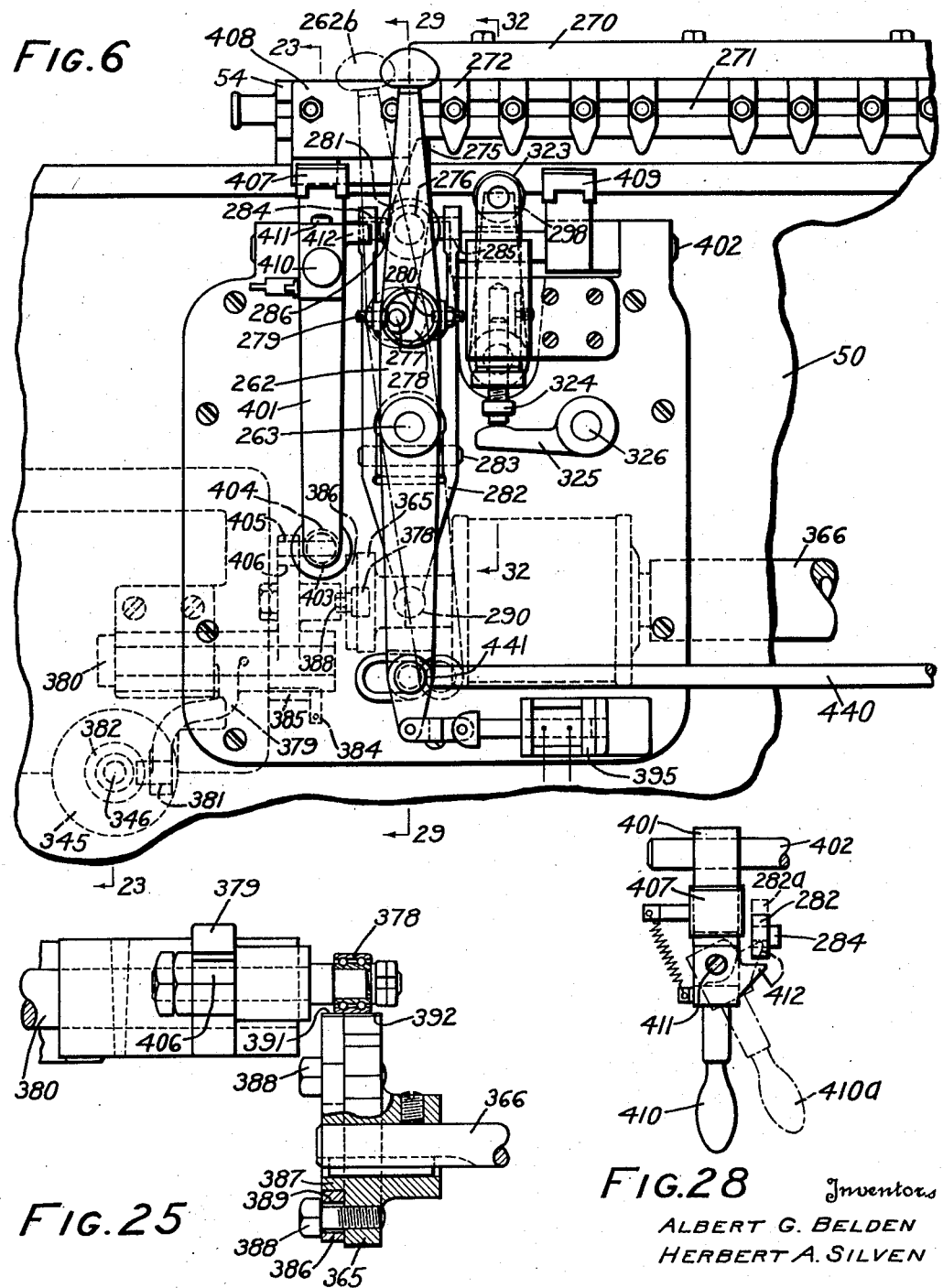
Nov. 26, 1935. A. G. BELDEN ET AL 2,022,178
HYDRAULICALLY OPERATED AUTOMATIC CAM GRINDING MACHINE
Filed April 16, 1932 18 Sheets-Sheet 6
Inventors
ALBERT G. BELDEN
HERBERT A. SILVEN
By Clayton R. Jenks
Attorney
WITNESSES
Franklin E. Johnson
Harold W. Eaton Nov. 26, 1935.  A. G. BELDEN ET AL  2,022,178
HYDRAULICALLY OPERATED AUTOMATIC CAM GRINDING MACHINE
Filed April 16, 1932    18 Sheets-Sheet 7
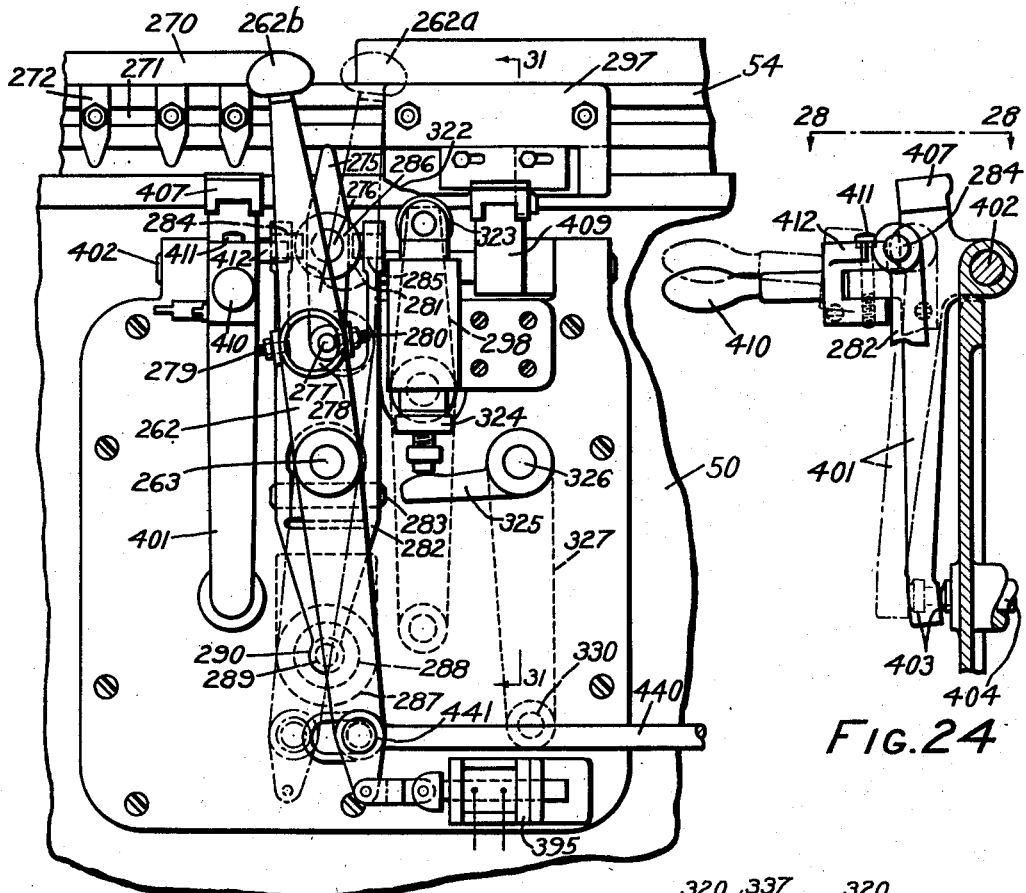
FIG.7
FIG.24
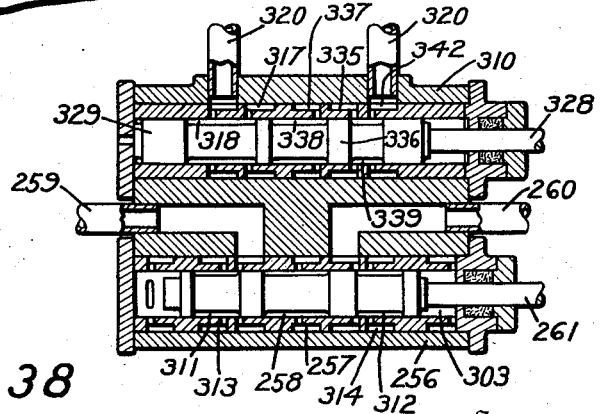
FIG.38
WITNESSES
Franklin E. Johnson
Harold W. Eaton
Inventors
ALBERT G. BELDEN
HERBERT A. SILVEN
By Clayton L. Jenks
Attorney

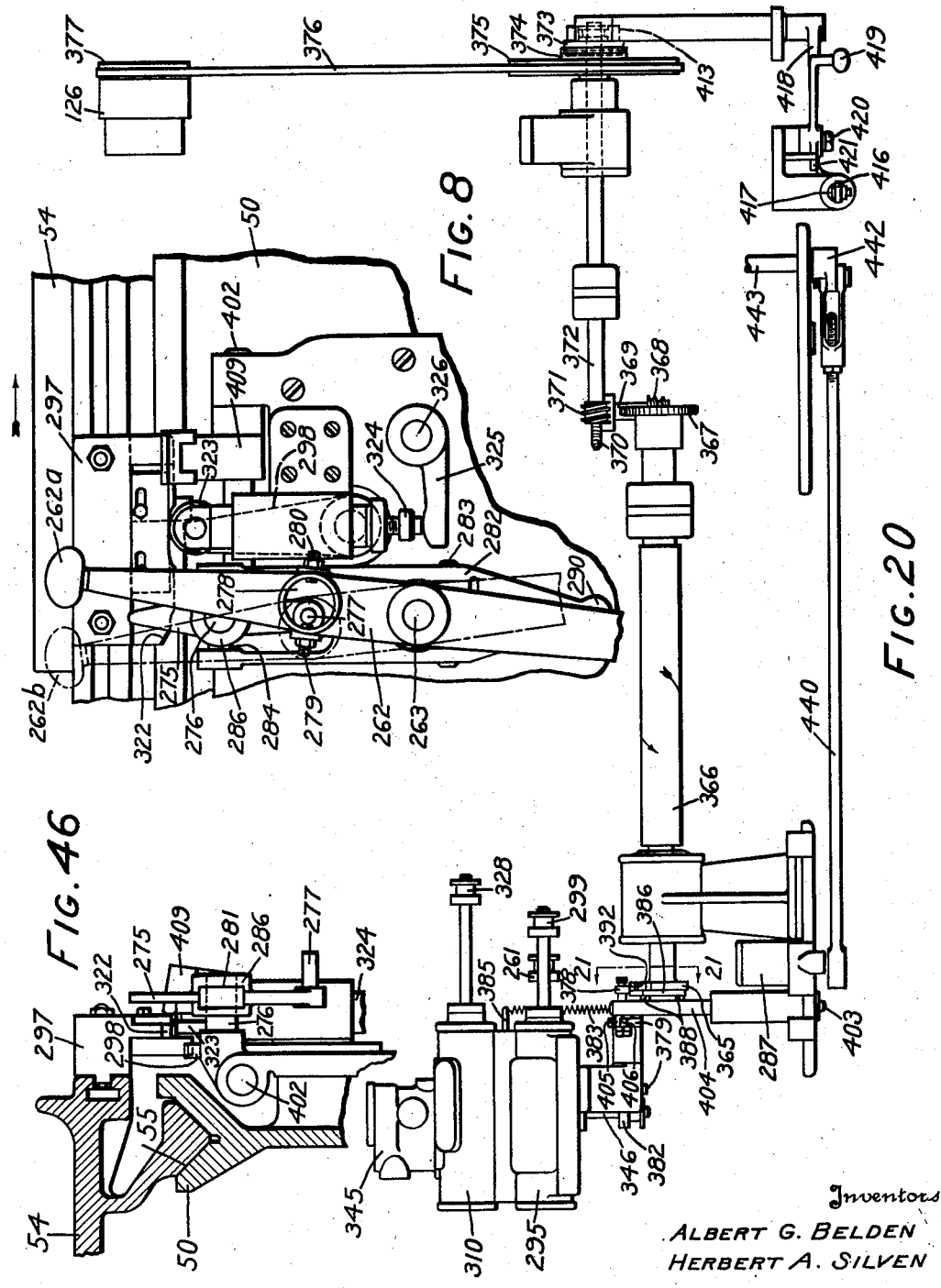

Nov. 26, 1935.  A. G. BELDEN ET AL  2,022,178
HYDRAULICALLY OPERATED AUTOMATIC CAM GRINDING MACHINE
Filed April 16, 1932  18 Sheets-Sheet 9
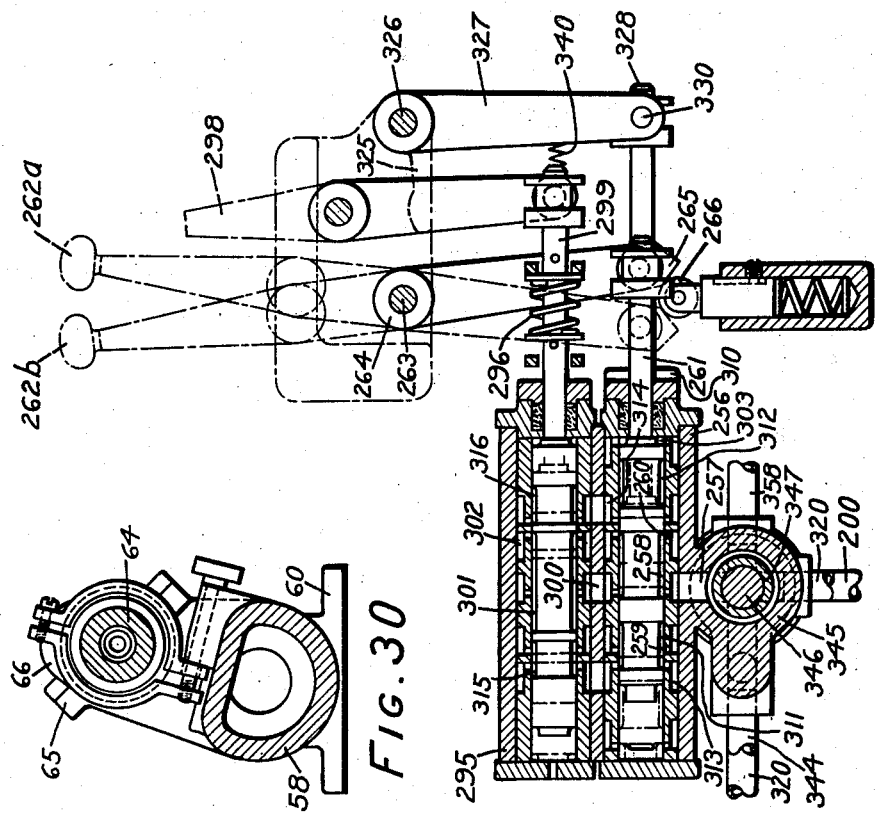
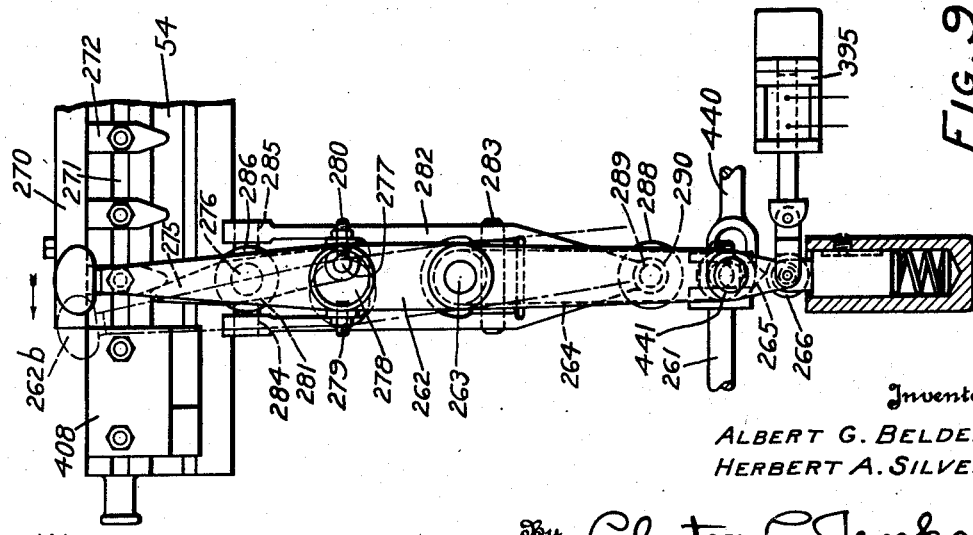
Inventors
ALBERT G. BELDEN
HERBERT A. SILVEN Nov. 26, 1935.   A. G. BELDEN ET AL   2,022,178
HYDRAULICALLY OPERATED AUTOMATIC CAM GRINDING MACHINE
Filed April 16, 1932   18 Sheets-Sheet 10
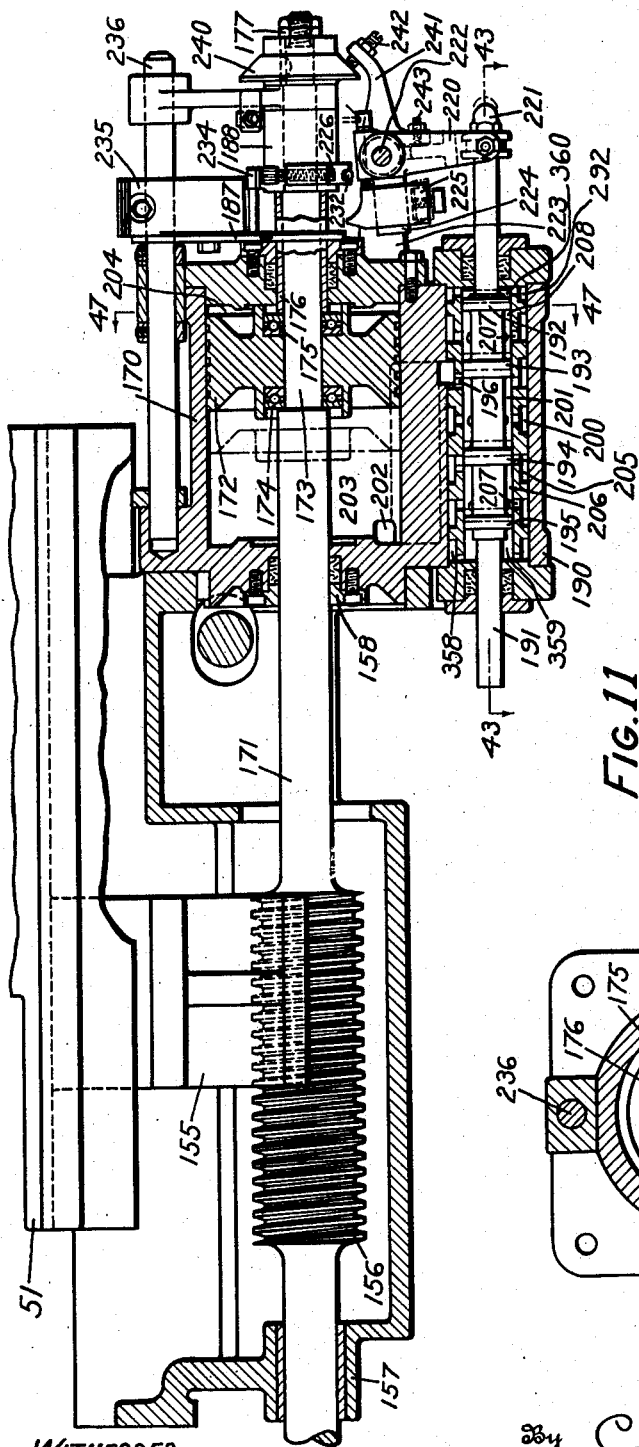
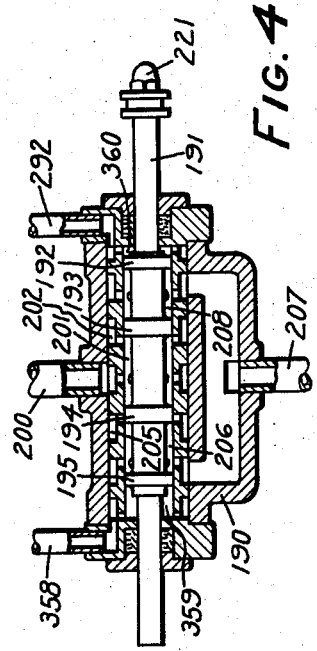
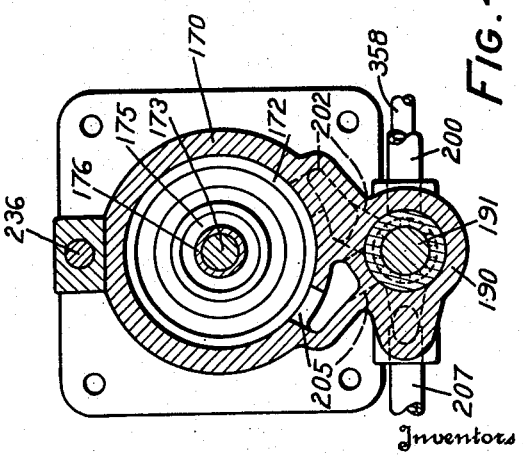
Inventors
ALBERT G. BELDEN
HERBERT A. SILVEN
By Clayton L. Jenks
Attorney
WITNESSES
Franklin E. Johnson
Harold W. Eaton

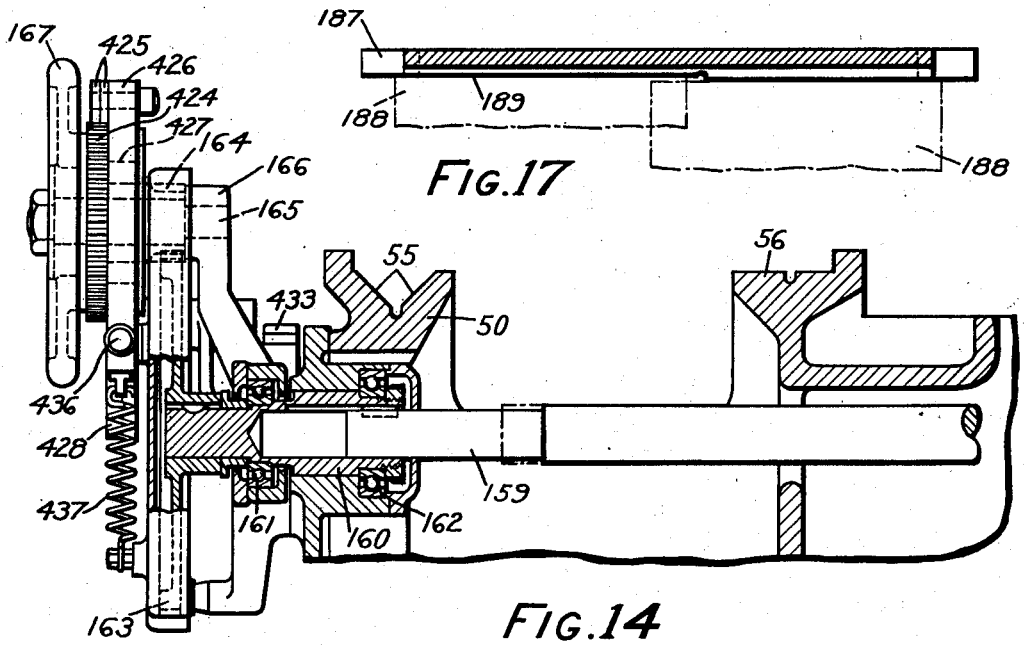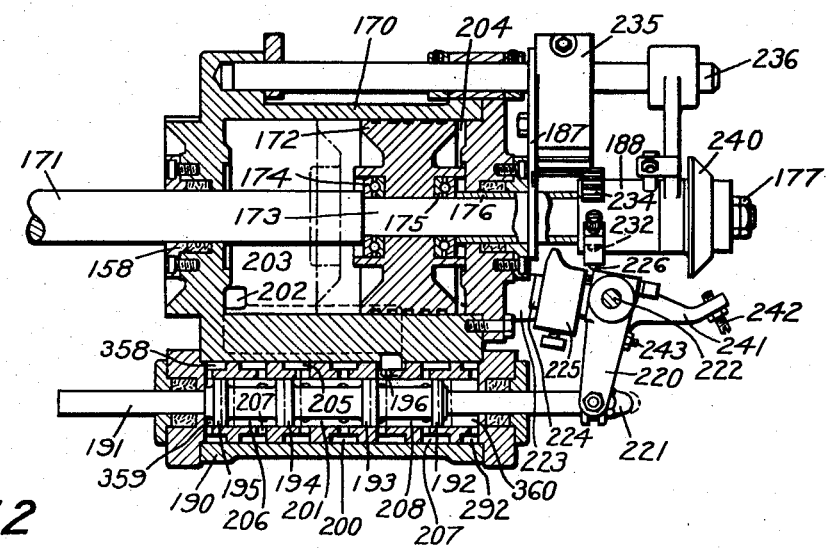

Nov. 26, 1935.  A. G. BELDEN ET AL  2,022,178
HYDRAULICALLY OPERATED AUTOMATIC CAM GRINDING MACHINE
Filed April 16, 1932  18 Sheets-Sheet 12

WITNESSES
Franklin E. Johnson
Harold W. Eaton

Inventors
ALBERT G. BELDEN
HERBERT A. SILVEN
By Clayton R. Jenks
Attorney

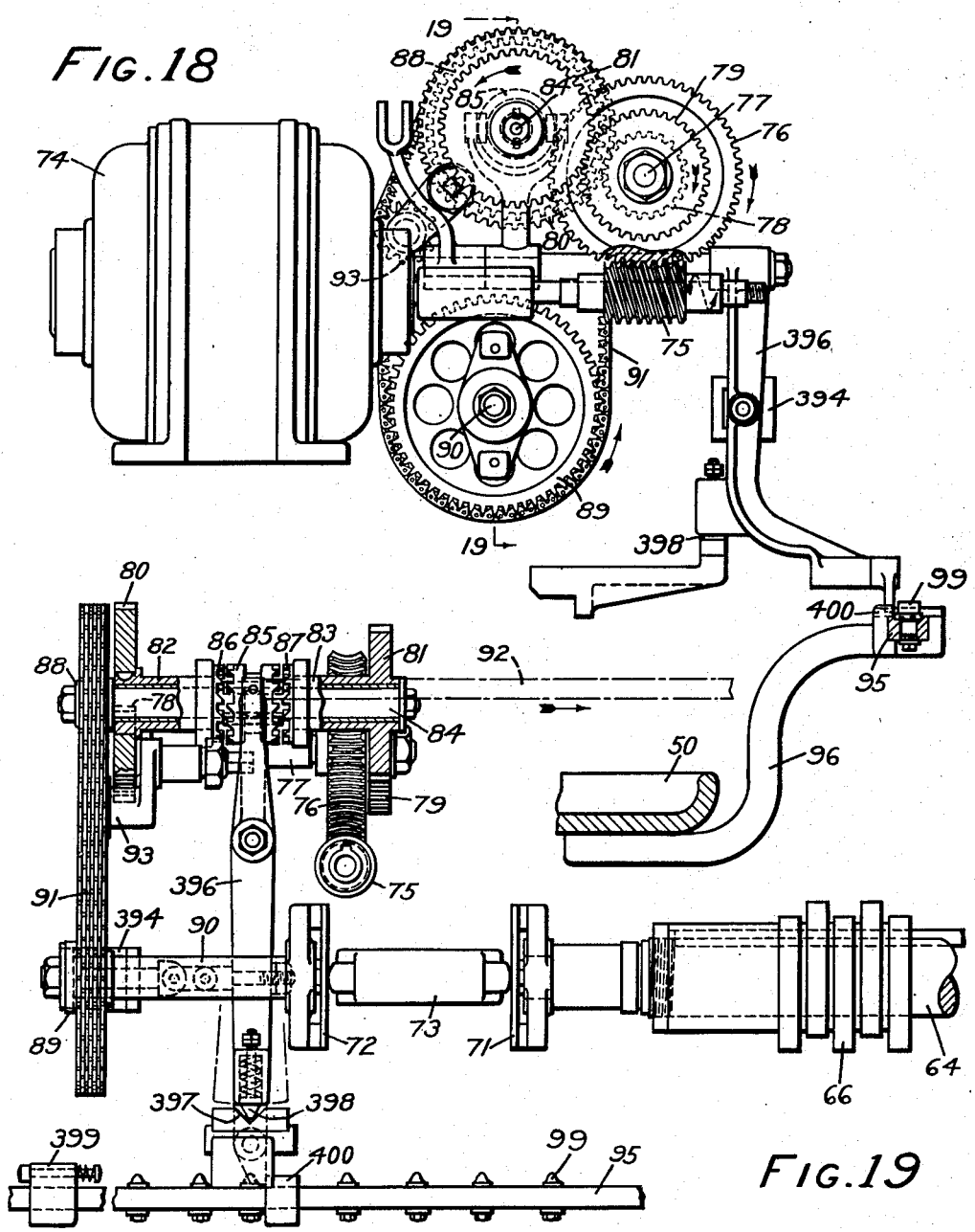

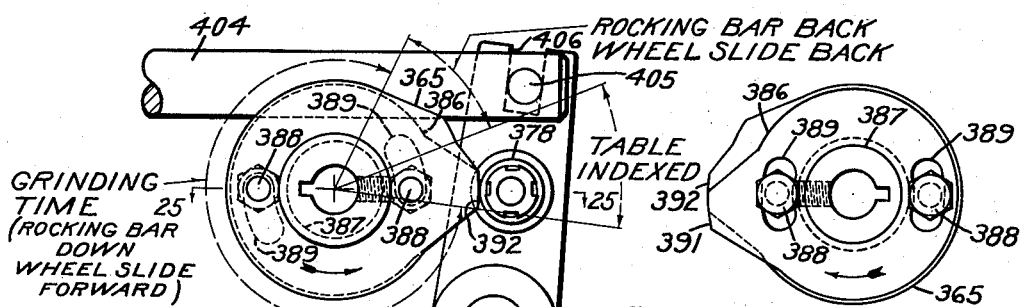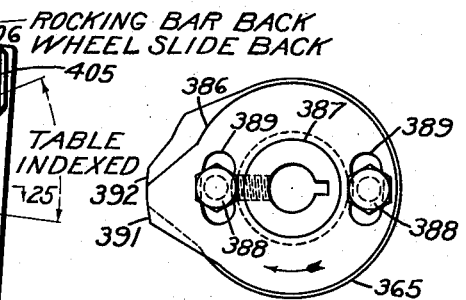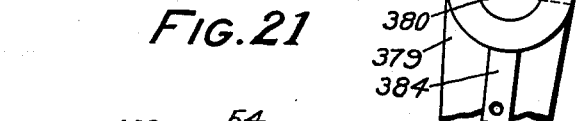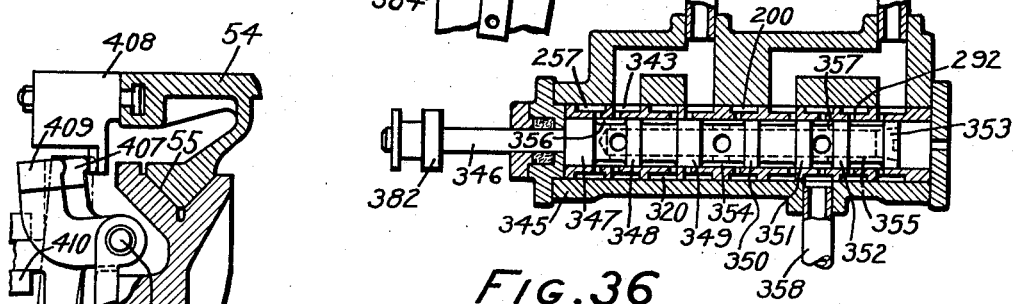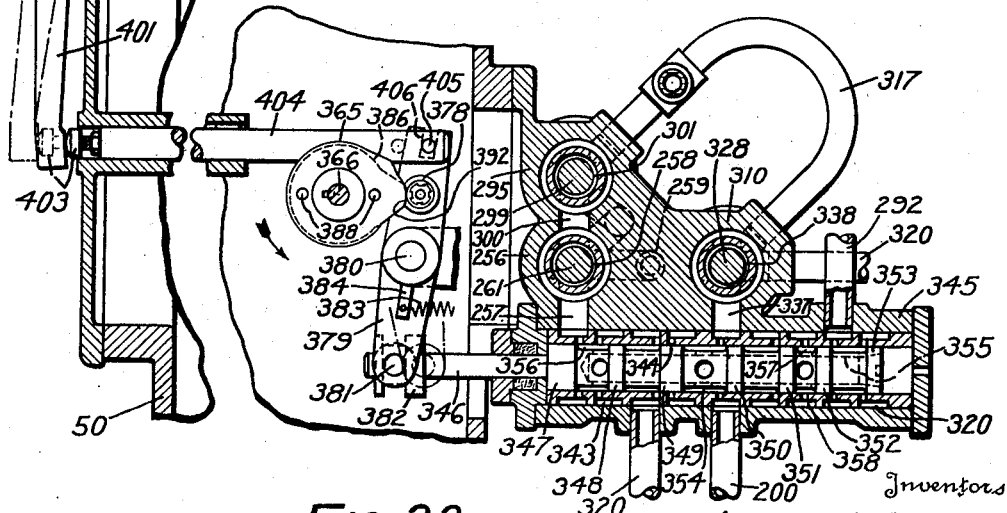

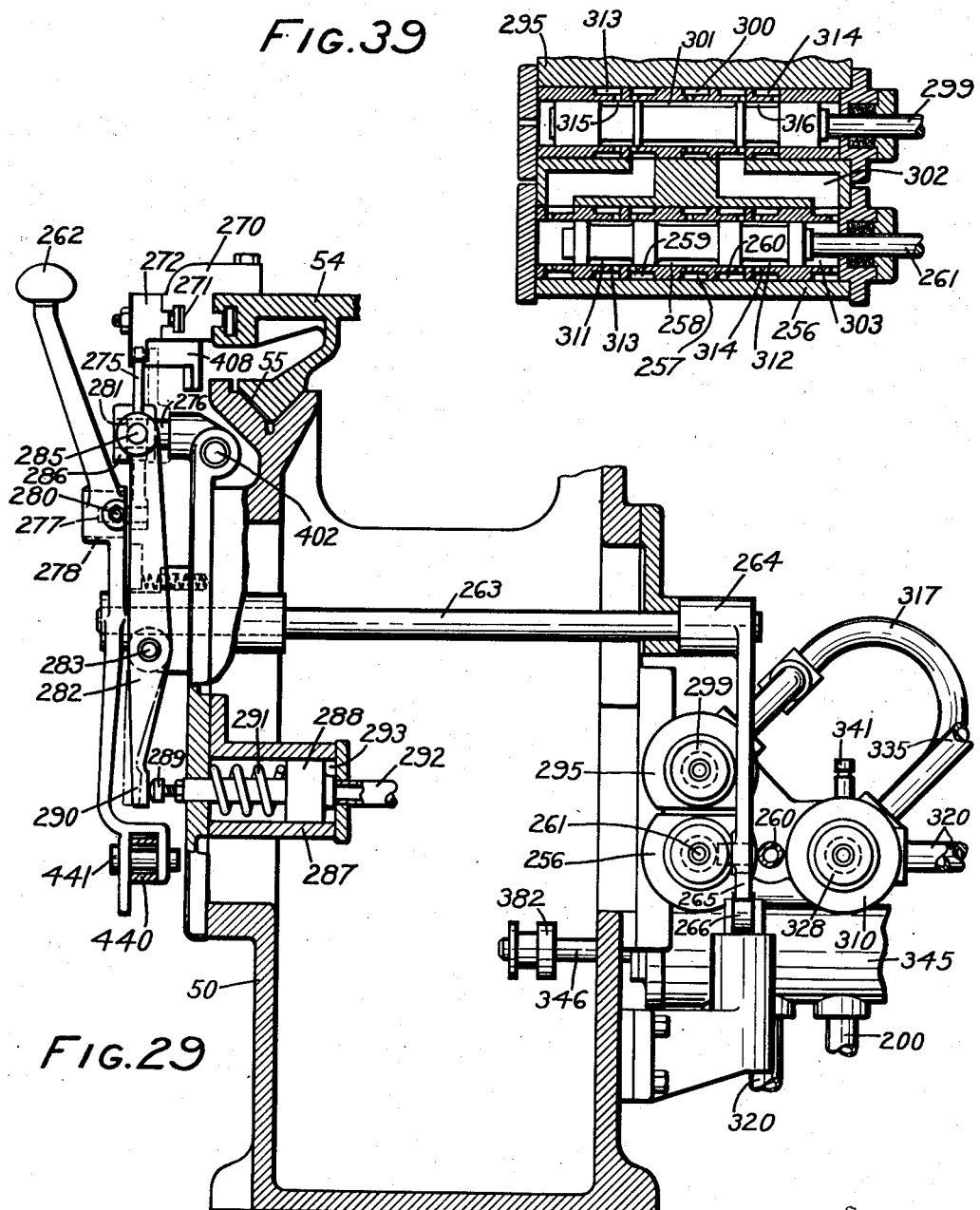

Nov. 26, 1935.   A. G. BELDEN ET AL   2,022,178
HYDRAULICALLY OPERATED AUTOMATIC CAM GRINDING MACHINE
Filed April 16, 1932   18 Sheets-Sheet 16

WITNESSES
Franklin E. Johnson
Harold W. Eaton

Inventors
ALBERT G. BELDEN
HERBERT A. SILVEN
By Clayton L. Jenks
Attorney

Nov. 26, 1935.　　A. G. BELDEN ET AL　　2,022,178
HYDRAULICALLY OPERATED AUTOMATIC CAM GRINDING MACHINE
Filed April 16, 1932　　18 Sheets-Sheet 17
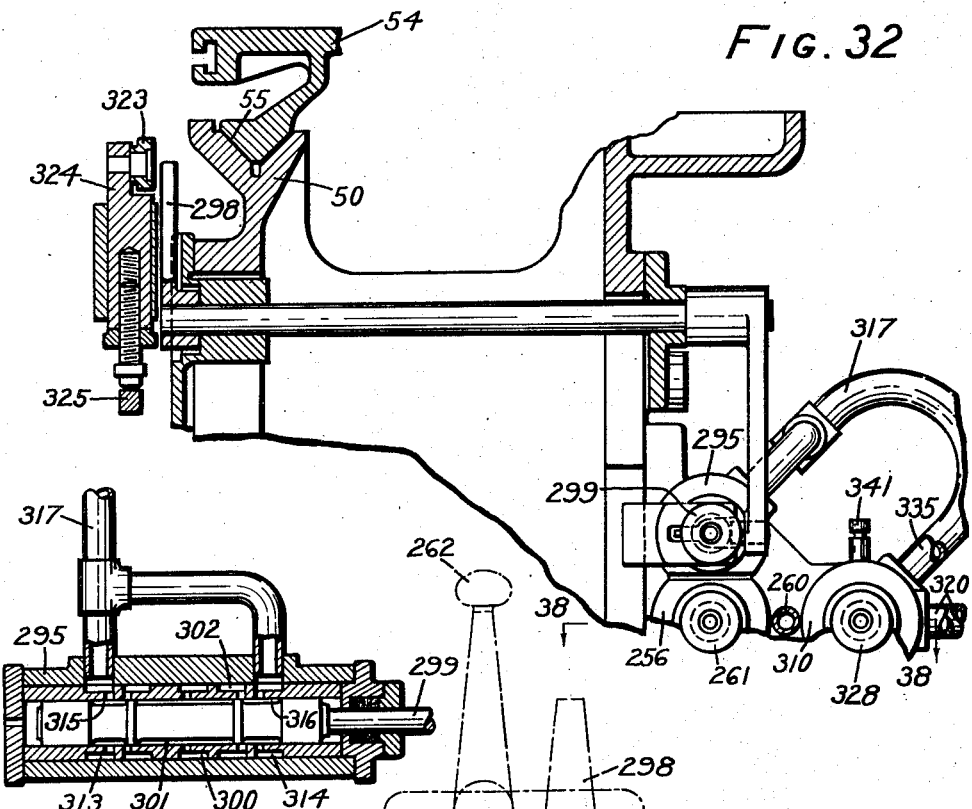
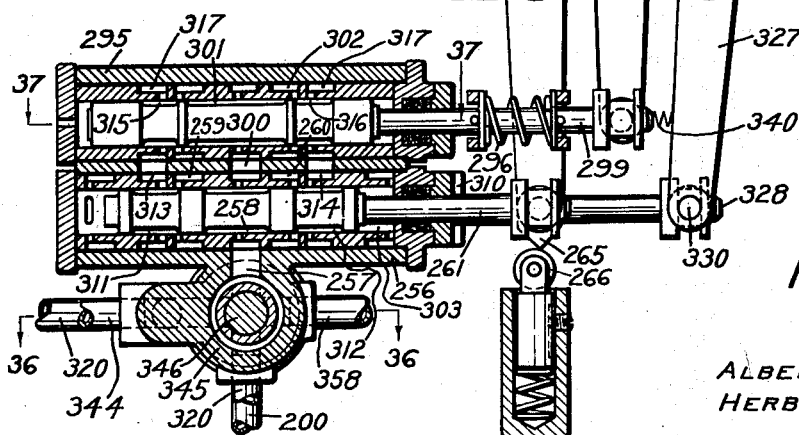
Inventors
ALBERT G. BELDEN
HERBERT A. SILVEN
By Clayton L. Jenks
Attorney
WITNESSES
Franklin E. Johnson
Harold W. Eaton Nov. 26, 1935.　　A. G. BELDEN ET AL　　2,022,178
HYDRAULICALLY OPERATED AUTOMATIC CAM GRINDING MACHINE
Filed April 16, 1932　　18 Sheets-Sheet 18

WITNESSES
Franklin E. Johnson
Harold W. Eaton

Inventors
ALBERT G. BELDEN
HERBERT A. SILVEN
By Clayton L. Jenks
Attorney

Patented Nov. 26, 1935

2,022,178

UNITED STATES PATENT OFFICE 2,022,178

HYDRAULICALLY OPERATED AUTOMATIC CAM GRINDING MACHINE

Albert G. Belden and Herbert A. Silven, Worcester, Mass., assignors to Norton Company, Worcester, Mass., a corporation of Massachusetts Application April 16, 1932, Serial No. 605,707

22 Claims. (Cl. 51—101)

This invention relates to a grinding machine and more particularly to an automatic machine for grinding camshafts.

Heretofore various machines have been developed for grinding camshafts. These machines require many manually operable movements to control the various mechanisms in successively grinding a plurality of spaced cams on a camshaft. In the ordinary cam grinding apparatus, it is necessary for the operator to manipulate a wheel feeding mechanism to feed the grinding wheel toward and from the work, to actuate a traversing mechanism to traverse the table and position the cams successively in operative relation with the grinding wheel, to rock the cam supporting bar to an inoperative position before traversing the work table and to rock it to an operative position after positioning another cam opposite to the grinding wheel, and to index the master cam roller manually to position it in operative relation with the master cam corresponding with the product cam to be ground.

Numerous advances have been made in the art, such as providing automatic indexing mechanism for positioning the master cam roller, and automatically rocking the cam shaft supporting bar to and from an operative position in timed relation with the other movements of the machine. But, in all of these modified cam grinding machines, manual manipulations have still been necessary for starting the grinding operation and for controlling many of the operations required for grinding a set of cams.

The truing of the operative face of the grinding wheel in all of the previous machines is accomplished as an independent operation and as such is dependent wholly upon the human element. The operator dressed the wheel only when he though such truing was necessary. To do this, the operator manipulated the cross feed mechanism to feed the grinding wheel towards the truing tool and dress or true off the desired amount from the grinding wheel. In resuming grinding after the truing operation, it was necessary for the operator to employ the cut-and-try method until the finished product was properly sized.

The primary object of this invention is to provide a cam grinding machine which starts by manipulation of a single control and which completely grinds successive cams on a camshaft and then stops at the end of the cycle of operations.

It is a further object of this invention to provide an automatic hydraulically operated cam grinding machine with a main control valve which is mechanically actuated by a cycle or control cam arranged to control the entire cycle of operation.

It is a still further object of this invention to provide a wheel spindle reciprocating mechanism for reciprocating the grinding wheel during the grinding operation which is hydraulically controlled by the main control valve so that the reciprocation of the grinding wheel is automatically stopped during the truing of the grinding wheel.

It is the specific object of this invention to provide such a machine in which the work supporting table is automatically and intermittently traversed or indexed to locate successive cams into operative relation with the grinding wheel to rough grind the cams while the camshaft is rotated at a relatively fast or rough grinding speed, then is automatically reciprocated to traverse a truing tool across the operative face of the grinding wheel at a very slow speed, and finally is automatically and intermittently traversed or indexed in the opposite direction to locate successive cams into operative relation with the grinding wheel to finish grind the cams while the camshaft is rotated at a relatively slow or finish grinding speed.

Other objects will be apparent from the following disclosure. One embodiment of this invention has been illustrated in the accompanying drawings, in which like reference numerals indicate like parts:

Fig. 1 is a front elevation of the improved automatic cam grinding machine;

Fig. 2 is a rear elevation of the machine;

Fig. 3 is a right-hand end view of the cam grinding machine on an enlarged scale, having the piston and cylinder for actuating the wheel spindle reciprocating mechanism broken away and shown in section to more clearly illustrate this feature;

Fig. 4 is a diagrammatic view, showing the fluid pressure system as well as a wiring diagram for the electrical control;

Fig. 5 is a similar diagrammatic view, showing the fluid pressure system with the valves in position to reverse the table index valve;

Fig. 6 is a fragmentary front elevation on an enlarged scale of the main control lever and the dog mechanism for controlling the table traverse or indexing movement, showing the main control lever in a neutral position;

Fig. 7 is a similar fragmentary view on an enlarged scale, showing the work table at the other end of its traversing stroke with the main control lever in an operating position to move the table in a direction toward the left and also showing the wheel truing control dog;

Fig. 8 is a similar fragmentary view on an enlarged scale, showing the truing dog in an operating position for reciprocating the work table to pass the diamond across the face of the wheel, showing the main control lever in full line and in extreme position to cause movement of the table toward the right and in a broken line position, showing its position for moving the table toward the left;

Fig. 9 is a similar fragmentary view on an enlarged scale, showing the main control lever in position after dog lever engages first dog and also showing the actuating solenoid;

Fig. 10 is a fragmentary sectional view through the control valves, showing the operating lever and main control lever in broken line;

Fig. 11 is a fragmentary sectional view, on an enlarged scale, taken approximately on the line 11—11 of Fig. 2, showing the feed screw and the fluid pressure mechanism for automatically controlling the feeding movement of the grinding wheel, showing the piston, feed screw and wheel slide in the extreme rearward position;

Fig. 12 is a similar fragmentary sectional view on an enlarged scale through the hydraulic wheel feeding mechanism, showing the control valve shifted to a reverse position to cause an infeeding movement of the grinding wheel;

Fig. 14 is a fragmentary cross-sectional view, on an enlarged scale, showing the feeding mechanism in elevation and taken approximately on the line 14—14 of Fig. 13;

Fig. 15 is a fragmentary rear view, on an enlarged scale, of the work sizing gauge block and its actuating mechanism for limiting the forward feeding movement of the grinding wheel for rough and finish grinding;

Fig. 16 is a fragmentary detail view on an enlarged scale of the actuator for moving the wheel feed valve stop screws and the sizing gauge block;

Fig. 17 is a fragmentary cross-sectional view, on an enlarged scale, of the gauge plate, taken approximately on the line 17—17 of Fig. 15;

Fig. 18 is a fragmentary view, on an enlarged scale, of the driving mechanism for the headstock spindle, showing the clutch actuating mechanism for changing the work rotation from a roughing to a finishing grinding speed;

Fig. 19 is a fragmentary view of the parts shown in Fig. 18, taken approximately on the line 19—19 of Fig. 18;

Fig. 20 is a fragmentary plane view, showing the driving mechanism for the master control cam and the main control valve mechanism;

Fig. 21 is a fragmentary view, on an enlarged scale, of the main control cam and its actuated lever, taken approximately on the line 21—21 of Fig. 20;

Fig. 22 is a detail view of the main control cam, showing the adjustable nose;

Fig. 23 is a fragmentary cross-sectional view, on an enlarged scale, taken approximately on the line 23—23 of Fig. 6, showing the main control cam and the connection between the cam for actuating the main control valve and also showing the valve mechanism in section;

Fig. 24 is a similar fragmentary sectional view, showing more fully the table positioning lever which is partially indicated in Fig. 23;

Fig. 25 is a fragmentary view, taken approximately on the line 25—25 of Fig. 21, showing the master cam partially in section and the master control cam follower;

Fig. 26 is a fragmentary view, on an enlarged scale, of the indexing mechanism for automatically indexing the master cam roller;

Fig. 27 is a fragmentary view of the master cam roller indexing mechanism shown in Fig. 26, taken from the right-hand end;

Fig. 28 is a fragmentary plan view of the table positioning lever, taken approximately on the line 28—28 of Fig. 24;

Fig. 29 is a fragmentary cross-sectional view through the machine, taken approximately on the line 29—29 of Fig. 6, showing the fluid pressure cylinder for actuating the table positioning lever;

Fig. 30 is a fragmentary cross-sectional view through the rock bar, showing the friction drive for eliminating lost motion between the master cam and the product camshaft;

Fig. 32 is a similar cross-sectional view, taken approximately on the line 32—32 of Fig. 6, showing the pilot valve actuating mechanism;

Fig. 33 is a longitudinal sectional view through the valve mechanism, showing the operating lever similar to Fig. 10, but showing the main control lever in a central position;

Fig. 36 is a fragmentary horizontal sectional view, taken approximately on the line 36—36 of Fig. 33, showing the main control valve in its forward position;

Fig. 37 is a fragmentary horizontal sectional view through the pilot valve, taken approximately on the line 37—37 of Fig. 33;

Fig. 38 is a fragmentary horizontal sectional view through the reversing valve and low speed valve, taken approximately on the line 38—38 of Fig. 32;

Fig. 39 is a similar fragmentary sectional view, taken approximately on the line 39—39 of Fig. 35;

Fig. 43 is a sectional view, taken approximately on the line 43—43 of Fig. 11, through the feed control valve;

Fig. 45 is a fragmentary plan view of the feed control valve actuating mechanism;

Fig. 46 is a fragmentary detail view showing the mounting for the dog lever; and Fig. 47 is a fragmentary cross-sectional view through the hydraulic wheel feed mechanism, taken approximately on the line 47—47 of Fig. 11.

Figure 13:
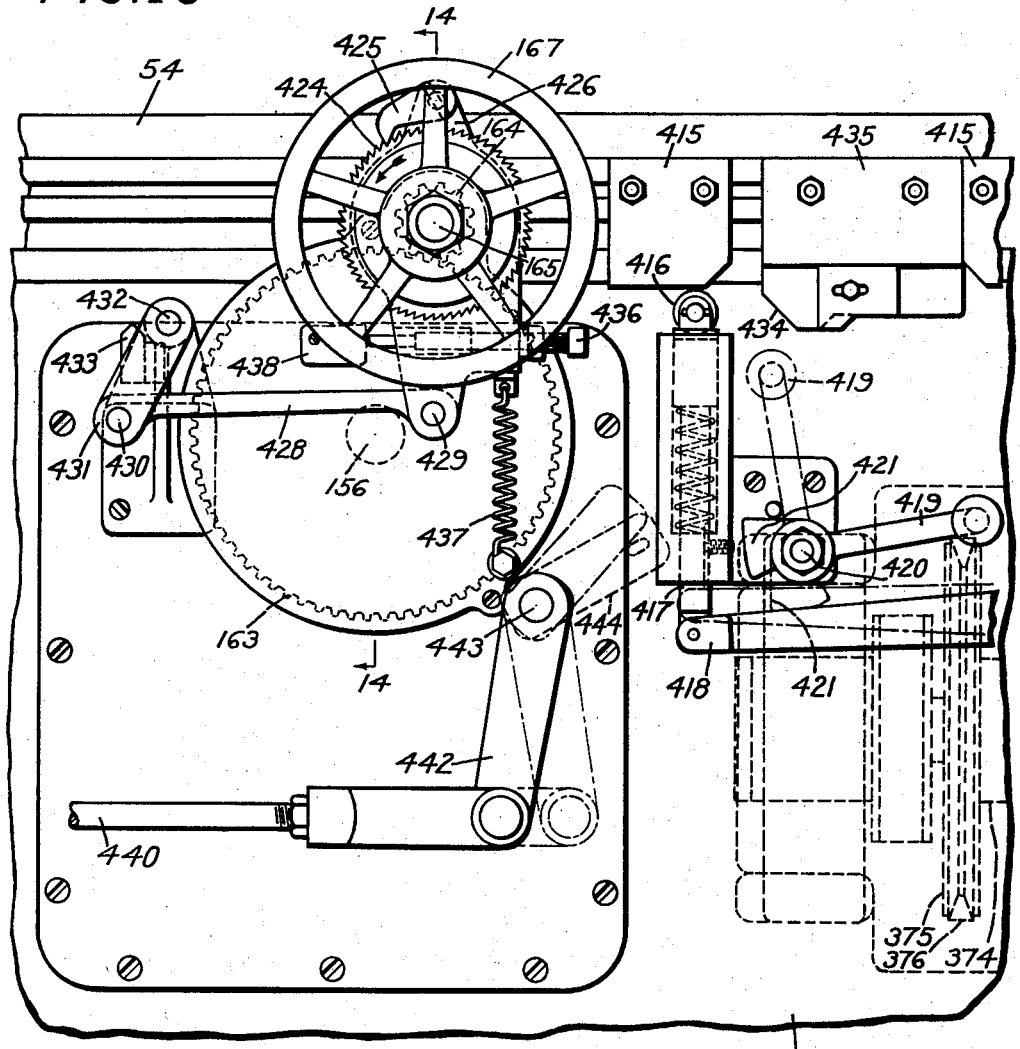
Fig. 13 is a fragmentary front elevation, on an enlarged scale, showing the wheel feeding mechanism.
Figure 44:
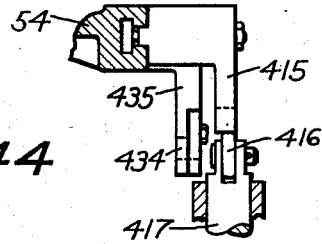
Fig. 44 is a fragmentary detail view showing the relative position of the clutch dogs and the wheel feed dog.

In accordance with this invention, an automatic grinding machine is provided which operates automatically through a predetermined cycle to rough and finish grind a camshaft and then stop in a loading position. The cycle of operation is started by pressing a single push button which automatically starts the work rotation at a relatively fast speed for rough grinding and at the same time through a hydraulic system traverses the work table longitudinally to bring the first product cam into operative relation with the grinding wheel. A main control cam then actuates the valve mechanism to move the grinding wheel through a grinding cycle to feed the wheel toward the work so as to rough grind the cam blank and then remove the wheel to its rearward position. The hydraulic traverse mechanism is then tripped to traverse the table to position the second cam in operative relation to the grinding wheel for rough grinding. The cycle cam then operates to move the grinding wheel through another rough grinding cycle. This operation is continued, as the camshaft is intermittently and successively traversed, to bring successive product cams into operative relation with the grinding wheel until all of the cams are rough ground. The work table is then traversed beyond the last cam, while the grinding wheel is in its rearward position to traverse a truing tool across the periphery of the grinding wheel. The grinding wheel is automatically fed into the diamond at each truing traverse of the table. The diamond is preferably so located relative to the axis of the work that the wheel face is trued in proper position for a finish grinding stroke, thus making it unnecessary for the operator to reset the wheel feeding mechanism after truing. The diamond may be passed across the face of the wheel in one or more reciprocations, as desired. The table then starts its reverse traversing movement to bring the last product cam into operative relation with the grinding wheel. When the table starts movement in the reverse direction, the work rotation clutch on the headstock is automatically shifted from a relatively fast rough grinding speed to a relatively slow finish grinding speed. The table traverses until the last product cam is in alignment with the grinding wheel and the main control cam actuating the hydraulic valve mechinism moves the grinding wheel through a finish grinding cycle to finish grind the cam blank. The grinding wheel is then automatically moved rearwardly and the table traverses to position the master cam roller in operative relation to the next master cam and the next product cam in operative relation to the grinding wheel. This cycle of operation continues until all of the cam blanks have been finish ground and the table then traverses beyond the first cam on the camshaft and the grinding cycle automatically stops.

As illustrated in the drawings, the improved automatic cam grinding machine comprises a base 50 which supports a wheel slide 51 for transverse movement thereon on the V-ways 52 which in turn rotatably supports a grinding wheel 53. The base also supports a longitudinally movable work supporting table 54 which is arranged to slide on a V-way 55 and a flat way 56.

*Camshaft supporting mechanism*

A rock bar 58 is journalled in the bearings 59 and 60 which are rigidly fixed to the table 54 so that bar 58 is free to rock therein. A headstock 61 and footstock 62 are mounted on the rock bar 58 and are provided with centers to rotatably support a camshaft 63. A master camshaft 64 is supported at one end in the headstock 61 and at the other end in a bearing 65 which is fixed to the rock bar. The master camshaft is provided with a plurality of spaced master cams 66 which correspond with the number of product cams on the camshaft to be ground. A master cam roller 67 is slidably mounted on a shaft 68 which is fixed in bearing brackets 69 and 70 which are in turn fixed to the table of the machine. It will be readily seen from this construction that when the master camshaft 64 is rotated with a master cam in engagement with the roller 67, a rocking motion will be transmitted to the bar 58 to rock the product camshaft toward and from the periphery of the wheel so as to produce the desired contour thereon.

*Work rotation*

The master camshaft and product camshafts are preferably rotated by a power drive through universal joints 71 and 72 and the connecting shaft 73. A motor 74 is preferably provided to rotate a worm 75, a worm wheel 76, to rotate a shaft 77 carrying gears 78 and 79 which in turn mesh with gears 80 and 81 respectively. The gears 80 and 81 are mounted on sleeves 82 and 83 respectively which are in turn rotatably mounted on a shaft 84. A clutch member 85 is slidably keyed on the shaft 84 so that it may be moved into engagement with the clutch teeth 86 to rotate the shaft 84 through the gears 78 and 80, or it may be thrown into engagement with the clutch teeth 87 to rotate the shaft 84 through the gears 79 and 81. The shaft 84 is provided with a chain sprocket 88 and is connected to a sprocket 89 on a shaft 90 by a link chain 91 and through the universal joints 72, 71 and a shaft 73 to rotate the master cam and product camshaft. The clutch member may be thrown manually by means of a hand lever 92 or it may be actuated automatically by a mechanism hereinafter described. An idler sprocket 93 is provided to permit the chin 91 to be properly tensioned and to take up any slack due to wearing of the parts.

*Automatic indexing master cam roller*

The master cam roller 67 is preferably indexed automatically so as to position it in operative relation with successive master cams on the master camshaft to conform with the cams being ground on the product camshaft. This mechanism, as illustrated in the drawings, is substantially the same as that illustrated in the prior patent to C. G. Trefethen et al. No. 1,783,755 dated December 2, 1930. Since this feature does not constitute the subject matter of the claims, it has been illustrated only in outline, as shown in Figs. 2, 26, and 27. For further disclosure as to details of this construction, reference may be had to the above-mentioned patent. A dog bar 95 is fixed by a bracket 96 to the base of the machine. The other end of the dog bar 95 is slidably supported in brackets 97 and 98 which are carried by the table 54. The dog bar 95 is provided with a plurality of adjustable dogs 99 engaged by a star wheel 100 which is mounted on a shaft 101. The shaft 101 carries a gear 102 meshing with a gear 103 which in turn meshes with a pinion 104 having extending teeth engaging a rack bar 105. The rack bar 105 is slidably mounted in the brackets 69 and 70 and is connected by a yoked member 106 to move the master cam roller 67 in an endwise direction. It will be readily appreciated from the foregoing disclosure that when the table 54 is traversed longitudinally, the star wheel will engage the dogs 99 successively which in turn, through the gearing 102, 103, and 104, will move the rack bar 105 and index the master cam roller 67 automatically into alignment with the master cam corresponding to the product cam.

Rock bar actuation

The rock bar 58 is normally held under a yieldable tension so that a master cam 66 is held in operative contact with the master cam roller 67. This tensioning device is similar to that shown in the prior patent above mentioned and preferably comprises a cylinder 110 pivotally supported on the bracket 70. A piston 111 is slidably mounted within the cylinder 110 and is connected by a piston rod 112 with an arm 113 which is fixedly mounted to the rock bar 58. A spring 114 is interposed between the piston 111 and a collar 115 in the base of the cylinder 110. The spring 114 is a compression spring of sufficient strength to hold the master cam 66 in proper contact with the master cam roller 67 during the rotation of the master cam and the rocking of the bar 58.

A fluid pressure mechanism is provided to rock the bar 58 to an inoperative position automatically before the table is traversed so that the master cam and follower and product cams and grinding wheel will be separated before the traversing of the table is started. This mechanism may comprise a fluid pressure cylinder 118, having a piston 119 slidably mounted therein. The piston is connected to a piston rod 120 arranged to contact with a projection 121 of the arm 113. When fluid under pressure is admitted to the cylinder 118, piston 119 moves downwardly and rocks the projection 121 and the arm 113 to rock the bar 58 and separate the master cam 66 from the follower roller 67 (Fig. 4). Fluid under pressure is preferably admitted to the cylinder 118 in a definite timed relation to the actuation of the other mechanisms of the machine, as will be hereinafter described.

Grinding wheel drive mechanism

The grinding wheel may be driven from any suitable source of power, such as a main driving motor 125 mounted either on the base of the machine or on the floor adjacent to the base, as illustrated in the drawings. The motor is connected by a pulley 126 and a belt 127 to a pulley 128 on the jack shaft 129 which is rotatably supported in bearings 130 and 131 on the wheel slide 51. The shaft 129 is provided with a pulley 132 which is connected by a belt 133 to rotate a grinding wheel spindle 134.

Wheel spindle reciprocating mechanism

The grinding wheel is fed by the straight-in or plunge-cut method. It is, therefore, desirable that a suitable mechanism be provided to reciprocate the grinding wheel axially during the grinding operation. In the machine illustrated in the drawings, a wheel spindle reciprocating device 135 is utilized. This mechanism has not been shown in detail, since it corresponds with the mechanism shown in the prior patent to Belden et al. No. 1,584,717 dated May 18, 1926. This mechanism preferably comprises a worm 136 mounted on the end of the wheel spindle which in turn meshes with a worm gear 137. The worm gear 137 is mounted on a shaft 138 and carries an eccentric 139 arranged to rock a yoked member 140. The yoked member 140 is arranged to be swung out of the path of the eccentric 139 by a cam 141 which is mounted on the end of a shaft 142. To stop the reciprocating motion of the wheel spindle, the operator may rock the shaft 142 and rock the yoked member out of operative contact with the eccentric, thereby stopping the reciprocating movement of the wheel spindle. The control of the wheel spindle reciprocating may be manual but in the preferred construction, it is desirable to provide an automatic control which may be actuated in timed relation with the machine mechanisms. As illustrated in the drawings (Figs. 3 and 4), a lever 143 is mounted on the outer end of the shaft 142 and a spring 144 is interposed between the end of the lever 143 and a stud 145 fixedly mounted on the lower end of a cylinder 146, the tension of the spring 144 normally holding the lever 143 in a position so that the wheel spindle and the grinding wheel are reciprocated. The cylinder 146, which is fixed to the wheel slide 51, is provided with a piston 147 connected by a piston rod 148 and link 149 with the lever 143. It will be readily appreciated from this construction, that when fluid is admitted to a chamber 150, it will cause a downward movement of the piston 147 and rock the lever 143 in a clockwise direction to stop the wheel spindle reciprocation. Fluid under pressure is admitted to this cylinder in timed relation with the actuation of the other mechanisms of the machine to stop the wheel spindle reciprocation during the truing of the grinding wheel, as is hereinafter described.

Grinding wheel feeding mechanism

The grinding wheel slide 51 is arranged for a feeding movement to control the movement of the grinding wheel toward and from the work. This mechanism preferably comprises a nut 155 depending form slide 51 and engaging a feed screw 156 which is rotatably mounted in the bearings 157 and 158 in the base 50 of the machine. A reduced end 159 of the screw 156 is slidably keyed within a sleeve 160 so as to permit endwise movement of the feed screw. The sleeve 160 is supported in anti-friction bearings 161 and 162 which are in turn supported on the base 50. A gear 163 is keyed to the outer end of the sleeve 160 and meshes with a pinion 164 which is rotatably mounted on a stud 165 supported on a bracket 166 on the base 50. The pinion 164 is connected to a hand wheel 167 to permit manual rotation or adjustment of the feed screw to position the grinding wheel in setting up the machine for a given operation.

In an automatic machine of this type, it is preferable to provide a suitable mechanism for rapidly moving the grinding wheel to and from a grinding position. As illustrated in the drawings, a fluid pressure mechanism is provided having a cylinder 170 which is formed either as an integral part of the base or fixedly mounted therein. The rod 171 which is preferably an extension of the feed screw 156 is aligned with the axis of the cylinder and serves as a piston rod. A piston 172 is slidably mounted within the cylinder 170 and is rotatably supported on a reduced end portion 173 of the piston rod 171. An end thrust bearing 174 is interposed between a shoulder on the rod 171 and one end of the piston 172 and a second end thrust bearing 175 is interposed between the other end of the piston 172 and a sleeve 176 which surrounds the portion 173 of the piston rod 171. The sleeve 176 is held in proper adjustment by means of adjusting nuts 177 on the outer end of the reduced portion 173. By tightening or loosening the nuts 177, the end thrust of the bearings 174 and 175 may be adjusted. It will be readily apparent from this construction that when the piston is moved endwise, it will transmit a feeding movement to the grinding wheel through the rod 171, feed screw 156, half nut 155, to move the wheel slide 51. The feed screw is arranged so that it may be rotated relative to the piston so that the operator, by manual rotation of the feed screw, may readily adjust the position of the grinding wheel relative to the fluid pressure mechanism.

In a feeding mechanism of this type, it is desirable that the grinding wheel be fed to a predetermined positive stop so that for each successive grinding operation, the grinding wheel may be moved to the same extent to grind new pieces of work. To accomplish this result, a gauge block 187 is mounted on the rear of the cylinder 170 and arranged to be engaged by a sleeve 188 on the reduced end portion 173 of the piston rod 171. When the piston moves forward to feed the grinding wheel into the work, the sleeve 188 contacts with the gauge 187 definitely limiting the forward feeding movement of the grinding wheel so that on successive grinds, the wheel may be brought to the same position.

A fluid pressure control valve 190 is provided to regulate the admission of fluid to said cylinder. This valve is preferably of the balanced piston type having a valve stem 191 and a plurality of valve pistons 192, 193, 194, and 195 which are slidably mounted within the valve 190. The ports in the valve are so arranged that fluid from a reservoir 198 is forced by a pump 199 through a conduit 200 into a valve chamber 201. As the valve stem 191 is shifted from one extreme to the other extreme position, the fluid flow may be changed from one side of the piston 172 to the other to reverse the direction of movement of the wheel slide.

In the preferred construction, it is desirable to connect the valve stem 191 so that when the piston 172 has reached a predetermined position in its stroke, the valve stem 191 is automatically shifted to partially cut off the fluid flow through the valve 190 to the cylinder 170. When the valve 190 is in the position illustrated in Fig. 4, fluid under pressure is forced through a pipe 202 into the cylinder chamber 203 to move the piston 172 toward the right-hand end of the cylinder and thereby cause a rearward movement of the grinding wheel and its supporting slide. During this movement, fluid is exhausted from a cylinder chamber 204, through a pipe 205, a valve chamber 206 and through an exhaust pipe 207 into the reservoir 198.

To obtain a forward feeding movement of the grinding wheel, the valve stem 191 is shifted toward the left, as viewed in Fig. 12, so that fluid under pressure passes from the valve chamber 201, through the pipe 205 into the cylinder chamber 204, to move the piston 172 and the grinding wheel toward the work. During this movement, fluid is exhausted from the cylinder chamber 203, the pipe 202, through a valve chamber 208 and exhaust pipe 207 into the reservoir.

It is desirable to have a finely adjustable port for regulating the exhaust of fluid from the chamber 203 so as to produce a slow but uniform feed of the grinding wheel into the work during the grinding operation. This is preferably accomplished by an actuating means which moves the valve stem 191 so that the valve piston 193 partially covers a V-port 196 connected with the pipe 202 so that fluid thereafter exhausts at a slower but uniform rate to produce the desired grinding feed of the wheel. If desired, the actuating mechanism may be so adjusted that the valve piston 193 entirely covers the V-port 196 so that fluid thereafter exhausts through a pipe 209, a needle valve 210, and a pipe 211 into the reservoir 198. By manipulation of the needle valve 210, the operator may obtain a desired slow grinding feed. The actuation of the valve stem 191 to obtain a reversal in direction of the grinding wheel movement is preferably obtained by means of a main control valve which is hereinafter described.

*Feed control valve actuating mechanism*

The feed control valve 190 is preferably actuated in timed relation with the movement of the piston 172 so that the forward feeding movement of the grinding wheel may be rapid until the wheel is about to contact with the surface of the work. This mechanism comprises a rock arm 220 having a yoked end provided with pins engaging the groove of a collar 221 on the outer end of the valve stem 191. The rock arm 220 is pivotally mounted on a stud 222 which is supported in brackets 223 on the base of the machine. The arm 220 has an inwardly extending arm 224 which carries an adjustable dog 225 which is arranged in the path of an adjustable screw 226 on the collar 188 which is carried by the reduced end portion 173 of the piston rod. It is readily apparent from this disclosure that when the rod 173 is moved in a direction toward the left, as viewed in Figs. 11 and 12, to cause an infeeding movement of the grinding wheel, the valve stem 191 is positioned so that both intake and exhaust ports are wide open to permit a rapid approaching movement of the grinding wheel toward the work. This movement continues until the adjustable stop screw 226 strikes the upper end or cam face of the dog 225 so as to rock the arms 224 and 220 and move the valve stem 191 so as to partially cut off the exhaust of fluid to produce a slower but uniform grinding feed of the wheel into the work.

In a machine of this type, where it is desirable to have two distinct grinding operations, namely, a roughing operation while the table is moving in one direction and a finishing operation when the table is moving in the opposite direction, a second feed control actuating mechanism is desirable. To accomplish this result, a second arm 230 and an adjustable dog 231 are mounted adjacent the bracket 223 (Fig. 45). The dog 231 is arranged in the path of a second adjustable screw 232 which is on the opposite side of the collar 188. By utilizing two separate valve actuating dogs, one for roughing and one for finishing, it is possible to vary the feed of the grinding wheel on each stroke, if desired.

When two of these dogs are employed, it is essential that either the stop screw 226 or 232 be in an inoperative position. In order that the stop screws 226 and 232 may be readily moved to and from an operating position, the collar 188 is provided with a gear segment 234 which meshes with a gear segment 235 which is mounted on a rock shaft 236. By rocking the shaft 236, the gear segments 235 and 234 may be rocked to move the collar 188 so as to move the stop screws 226 and 232 to and from an operative position relative to the adjustable dogs 225 and 231.

It is also desirable to provide a suitable mechanism for shifting the valve stem 191 when the wheel is moving rearwardly to either stop the rearward feeding movement or slow down its movement before the piston 172 engages the end of the cylinder. This is preferably accomplished by means of a collar 240 which serves as a cam to rock a bell crank lever 241 which is mounted on the stud 222 so as to cause a movement of the rock arm 220 and valve stem 191 toward the left, as viewed in Figs. 11 and 12. An adjusting screw 242 is located adjacent the outer end of the bell crank lever 241 to permit adjustment of the time when the valve is actuated. A similar adjusting screw 243 is provided at the lower end of the bell crank and is arranged to engage a portion of the rock arm 220 to provide a further adjustment so that the valve stem 191 may be moved a sufficient distance to partially cut off the exhaust of fluid from the pipe 205 or to entirely cut it off so as to either slow down or stop the rearward movement of the grinding wheel.

*Table traverse or indexing movement*

The work supporting table 54 is traversed or indexed longitudinally and automatically by means of a fluid pressure system comprising a cylinder 250 which is fixed to the base of the machine. A piston 251 is slidably mounted within the cylinder 250 and is connected by a piston rod 252 to a bracket 253 depending from the under side of the table 54. The admission of fluid to either cylinder chamber 254 or 255 is controlled by a valve 256. Fluid from the pump 199 passes through pipe 200, a pipe 257 into a valve chamber 258. A pipe 259 is connected between the valve 256 and the cylinder chamber 254 and a pipe 260 is connected between the valve 256 and the cylinder chamber 255. It will be readily apparent from this disclosure that when the valve 256 is in the position illustrated in Fig. 4, no fluid will be admitted to either of the cylinder chambers and the table will remain stationary. The valve 256 is provided with a valve stem 261 which is operatively connected to a manually operable control lever 262 mounted on a rock shaft 263 by means of a short arm 264. The arm 264 is mounted on the rear end of shaft 263 and has a pin engaging a groove on the valve stem 261. It will be readily apparent from this construction that when the lever 262 is moved in a clockwise direction, the valve stem 261 will be moved toward the left, as viewed in Fig. 4, so as to admit fluid through pipe 259 to the cylinder chamber 254 and cause a movement of the table 54 toward the right (Figs. 1 and 4). Similarly, when the lever 262 is moved in a counterclockwise direction, the valve stem 261 will be moved toward the right (Fig. 4) so as to pass fluid through the pipe 260 into the cylinder chamber 255 to move the table 54 toward the left (Figs. 1 and 4).

The lever 262 is normally held in the full line position 262b as indicated in Fig. 7 or in the broken line position 262a by means of an arrow point 265 on the lever fixed on the end of the shaft 263 and engaged by a spring pressed roller 266. The lever 262 is in the dotted line position 262b (Figs. 6 and 8), while the table is indexed intermittently in a direction toward the left. The lever 262 is in the full line position 262a, as indicated in Fig. 8, while the table is being indexed intermittently as it moves toward the right. The valve stem 261 is normally in a position to admit fluid either through the pipe 259 or the pipe 260 to the cylinder 250. The admission of fluid through the pipe 257 to the valve 256 is controlled by a main control valve, as will hereinafter be described.

An actuating mechanism is provided for the valve so that movement of the work supporting table 54 operates to close the valve 256 so that when the table is traversed a predetermined distance to position the next cam in front of the grinding wheel, the valve is automatically closed to stop the table against further movement. This is preferably accomplished by means of a dog bar 270 which is adjustably mounted on the front edge of the table. The dog bar 270 is provided with a T-slot 271 in which is a plurality of adjustable dogs 272. The dogs may be adjusted along the bar 270 to conform with the spacing of the cams on the product camshaft. The dog bar, if necessary for any variation in successive camshafts, may be adjusted longitudinally of the table without upsetting the adjustment of the individual dogs.

In order that the control lever 262 may move in the direction of movement of the table, it is necessary to provide a secondary actuating lever for cooperating with the table dogs. As illustrated in the drawings, a dog lever 275 is pivotally mounted on a stud 276. The lower end of the dog lever 275 is provided with a projecting pin 277 which rides in a cylindrical aperture 278 in the lever 262.

Assuming the lever 262 is positioned as illustrated in Fig. 6, that is, in a neutral or position for starting of the grinding cycle, the lever 262 is thrown either manually or automatically into position 262b to move the valve stem 261 and admit fluid through pipe 260 into cylinder chamber 255 to start the movement of table 54 in a direction toward the left, as viewed in Fig. 6. This movement traverses the camshaft supporting table 54 to bring the first product cam into operative relation with the grinding wheel. The traversing movement continues until the dog lever 275 is engaged by the first dog 272. The log lever 275 is rocked from the position indicated in Fig. 6 into the position illustrated in Fig. 9, swinging the pin 277 from engagement with a stop screw 279 into engagement with a stop screw 280, both of which are carried by the lever 262, and then swings the lever 262 from position 262b into the full line position illustrated in Fig. 9, with the arrow point 265 depressing the spring pressed roller 266. The parts, however, are adjusted so that the arrow point does not reach the high point on the spring roller, so that the roller is at all times exerting a pressure tending to move the lever either toward the right or toward the left. The swinging of the lever 262 from position 262b into the full line position, as indicated in Fig. 9, moves the valve stem 261 into the position illustrated in Fig. 4, so as to cut off fluid pressure from both of the pipes 259 and 260, thereby stopping the movement of the work carrying table. By adjusting the position of the dogs 272 along the dog bar 270, the stopping position of the table may be adjusted as desired so that the product cams will be positioned successively in operative relation with the grinding wheel.

The dog lever 275 is slidably mounted on the stud 276 so that it may be thrown out of the path of the dogs 272 to permit a further traversing movement of the table. A lever 282 is pivoted on a stud 283 and at its upper end is formed as a yoke having pins 284 and 285 engaging slots 281 in opposite sides of the hub 286 of the lever 275. When the lever 282 is moved from the full line position, as indicated in Fig. 29, into the broken line position, the dog lever 275 is moved rearwardly on the stud 276 out of the path of the dog 272 so as to permit a further traversing or indexing movement of the table. This movement is preferably accomplished in timed relationship with the other operating mechanisms of the machine. A fluid pressure cylinder 287 is mounted within the machine base and is provided with a piston 288 having a piston rod 289 engaging an end 290 of the lever 282. A spring 291 which surrounds the piston rod serves to normally retain the piston 288 in its rearward position. Fluid pressure is admitted through a pipe 292 into a cylinder chamber 293 in timed relationship with the other operating mechanism of the machine, to rock the lever 282 and thereby slide the dog lever 275 into an inoperative position out of alignment with the dogs 272. This mechanism is preferably connected to a main control valve, which is hereinafter described, so as to operate automatically in timed relation with the other movements of the machine.

*Pilot valve*

After the work table has been indexed intermittently for grinding successive cams on a camshaft, it is then desirable to shift the traverse or table index control valve 256 into a reverse position so that the arrow point 265 rides on the opposite side of the axis of the spring pressed roller 266. This is preferably accomplished by means of a pilot valve 295 which is of a balanced piston type valve and normally held in a neutral or inoperative position by means of a spring 296. When the table reaches its end position in its movement towards the left, a depending projection on an adjustable truing dog 297 engages the upper end of a pilot valve lever 298 and rocks it so as to move a valve stem 299 towards the right into position as shown in Fig. 5, so as to admit fluid which enters through a pipe 300 and a valve chamber 301 into a pipe 302 which passes fluid under pressure into a valve chamber 303 at one end of the traverse of the index control valve 256. This pressure moves the valve stem 261 so that the control lever 262 and arrow point 265 pass over the high point on the roller 266 and shifts the valve 256 into a reverse position (as shown in broken line in Fig. 10) so that after truing of the grinding wheel, the table 54 is ready for an intermittent traversing or indexing movement in a direction toward the right, as viewed in Figs. 1 and 8.

*Wheel truing mechanism*

In a machine of this type where a rough and finish grinding operation are accomplished on two successive traversing movements of the camshaft in opposite directions, it is desirable that the wheel be automatically trued in between operations so that the finish grinding may be accomplished by a freshly trued wheel face. A bracket 305 is fixedly mounted on the table 54 and carries a truing tool 306 which may be adjusted by a micrometer mechanism 307. After the last cam on the shaft has been ground, the grinding wheel is moved to an extreme rearward position with the piston 172 engaging the rear end of the cylinder (Fig. 11). The table 54 is then given an additional traversing movement to carry the previously adjusted diamond or truing tool 306 across the grinding wheel 53, while it is in its extreme rearward position.

Figure 42:
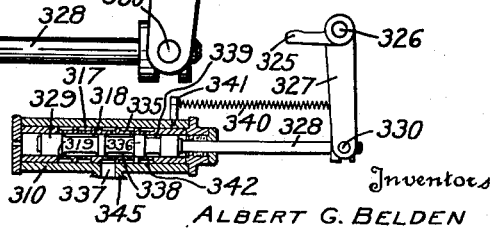
Fig. 42 is a sectional view similar to Fig. 40, on a reduced scale, showing the slow speed valve at the opposite end of its stroke.

The normal traversing or indexing movement of the table is comparatively rapid to prevent loss of time between successive grinding operations. This table speed is not at all suited for a truing operation which requires a very slow, uniform relative traversing movement between the truing tool and the grinding wheel. To attain a slow feeding movement of the table, a suitable slow speed or throttle valve 310 is provided. When fluid is exhausted from the cylinder 250, through either pipe 259 or 260, it passes through either chamber 311 or 312, pipes 313 or 314 respectively and then through valve chambers 315 or 316 in the pilot valve 295 and through a common exhaust pipe 317 which enters a valve chamber 318 in the slow speed valve 310. A V-port 319 in the valve chamber 318 is connected by a pipe 320 with the reservoir. During the normal traversing or indexing movement of the table, the V-port 319 is wide open permitting unrestrained exhaust of fluid from the cylinder 250. When the table 54 indexes or traverses from the last cam on the camshaft and moves toward a truing position, a cam 322 on the truing dog 297 strikes a roller 323 which is mounted on the upper end of a spring pressed plunger 324. The lower end of the plunger engages a rock arm 325 mounted on the outer end of a rock shaft 326. The other end of the shaft 326 carries a rock arm 327 which is connected by a pin 330 to move a valve stem 328 of the slow speed valve 310. When the cam 322 moves the roller 323 downwardly, it rocks the shaft 326 and arm 327 and valve stem 328 moves the valve piston 329 toward the right (Fig. 4) into the position illustrated in Fig. 42, with the V-port 319 partially closed, thereby restricting the exhaust of fluid from the cylinder 250 so as to produce a slow traversing movement of the work table and the diamond or truing tool 306 across the operative face of the grinding wheel 53.

At the same time the slow speed valve moves to throttle the exhaust of fluid to cause a slow truing movement of the table, a pipe 335 is uncovered by movement of a valve piston 336 to admit fluid from a pipe 337 through a valve chamber 338, a pipe 335, into the cylinder chamber 150 to actuate the lever 143 and thereby stop the wheel spindle reciprocation during the truing movement. The table continues its truing movement towards the left until the pilot valve lever 298 engages the truing dog 297 to move the pilot valve from a neutral position and admit fluid under pressure into the chamber 303 of the traverse valve 256 to reverse the direction of travel of the table. The table moves slowly to pass the diamond across the face of the wheel on its return stroke. The slow movement continues until the roller 323 rides up the cam 322 on dog 297 as the table approaches the last cam on the shaft. A spring 340 connected between the lever 327 and a stud 341 on the valve casing 310 serves to return the valve stem 328 to its normal position so as to uncover the pipe 335 and allows fluid to exhaust from the cylinder chamber 150 through pipe 335, valve chamber 339, pipe 342 and pipe 329 into the reservoir, thus allowing the spring 144 to start the wheel spindle reciprocation ready for finish grinding the first cam on the return stroke. At the same time, the V-port 319 is uncovered and unrestricted exhaust of fluid from the cylinder 256 starts the table 54 at its normal traversing or indexing speed.

While the apparatus as shown is adapted for passing the diamond across the face of the wheel once in each direction, it is possible by utilizing a special type of control dog including a cam actuated star wheel to produce any even number of passes of the diamond across the operative face of the grinding wheel.

*Main control cam and valve*

In a machine of this type where the mechanisms function automatically to successively grind a plurality of cam blanks on a camshaft, it is essential that all of the mechanisms be properly timed. Inasmuch as most of the mechanisms of the machine are controlled by fluid pressure mechanisms, it is desirable to provide a main control valve which is so controlled as to admit fluid under pressure successively to the various mechanisms of the machine to produce the desired cycle of movement. As illustrated in the drawings, a main control valve 345 having a valve stem 346 is arranged to control the movement of the hollow valve member having pistons 347, 348, 349, 350, 351, 352, and 353. Fluid under pressure from pump 199 passes through pipe 200 into a valve chamber 354 in the main control valve 345. From this chamber, fluid under pressure passes through the pipe 337 into the chamber 338 in the slow speed or throttle valve 310. Fluid under pressure from the chamber 354 also passes through a central aperture 355 extending longitudinally within the movable main control valve. Fluid from the passage 355 enters the valve chamber 356 and passes out through the pipe 257 into the valve chamber 258 of the traverse or table index control valve. At the same time, fluid under pressure passing through the central aperture 355 passes into a valve chamber 357 and out through pipe 358 into a valve chamber 359 in the feed control valve 196. Fluid under pressure entering the chamber 359 serves to move the feed control valve in a direction toward the right to uncover the pipe 202 so as to cause a rearward feeding movement of the grinding wheel.

*Main control cam*

In order that the mechanisms may function in proper sequence, it is desirable to provide a suitable mechanism for actuating the main control valve 345. In the preferred construction, this mechanism comprises a main control cam 365 which is mounted on the end of a shaft 366 which is journaled in the base of the machine. The other end of the shaft 366 carries a worm gear 367 meshing with a worm 368 on a shaft 369. Shaft 369 also carries a worm gear 370 meshing with a worm 371 on the end of a shaft 372. The outer end of the shaft 372 is provided with a clutch member 373 which is arranged to engage a clutch member 374 on a driving pulley 375, which is driven by a belt 376 from a pulley 377 on the armature shaft of the motor 125. It will be readily appreciated from this construction that when the clutch member 373 is thrown into engagement with the clutch member 374, the main control cam 365 will be rotated. The main control cam is arranged to transmit its motion to a follower roller 378 on a rock arm 379 which is pivotally mounted on a stud 380. The lower end of the arm 379 is connected by pin 381 with a grooved member 382 on the outer end of the main control valve cam stem 346. A spring 383 interposed between a stud 384 on the arm 379 and a stud 385 on the valve casing serves to hold the follower roller 378 always in engagement with the master or main control cam 365 so that as the cam rotates, the roller will follow the shape of the cam and transmit a corresponding movement to the valve stem 346.

The cam 365 is preferably so shaped that one rotation of the cam moves the main control valve stem 346 through one cycle to operate the various mechanisms of the machine so as to grind one cam and then index the work supporting table to position the next cam in operative relation with the grinding wheel. The table indexing or traversing movement which moves the work supporting table to position the next cam blank in operative relation to the grinding wheel is accomplished by the nose or high point of the cam. On various camshafts, the spacing between the cams varies somewhat and in order to compensate for the varying distance between cams, it is desirable that the noses of the cams be adjustable so that the mechanism may be set for the desired traversing movement of the table without loss of time, as in case a fixed cam were utilized. This is accomplished by providing a secondary cam 386 which is supported on a hub 387 on the cam 365. The cam 386 is connected to the cam member 365 by means of screws 388 which pass through arcuate slots 389 in the cam 386 and are screw threaded into the cam 365. By adjusting the cam 386 relative to the cam 365, the nose 391 of the cam 386 may be adjusted so that it coincides with the nose 392 of the cam 365 or may be rotated so that it increases the effective length of the nose so that the indexing time between grinding successive cams may be varied as desired.

*Electric starting control*

In an automatic grinding machine of this type, it is desirable to minimize the manual effort required in controlling the machine and to make the cycle of operation, after the work has been placed in position on the work supporting centers, as near fully automatic as possible. To accomplish this result, it is desirable to provide an electrical circuit having a starting push button or switch 393 located adjacent to the footstock in its starting position so that when the operator adjusts the footstock, upon putting a new piece of work into the machine, he may simply press a push button 393 to close an electric circuit to energize a solenoid 394 so as to engage the clutch member 85 with the clutch teeth 87 to start the work rotation at a relatively fast speed for rough grinding, and at the same time to energize a solenoid 395 which is arranged to swing the table traverse or indexing valve control lever 262 in a counter-clockwise direction so that fluid under pressure may pass through the pipe 260 into cylinder chamber 255 to start the table 54 in a direction toward the left (Figs. 1 and 4) to position the first cam on the camshaft to be ground in operative relation with the grinding wheel. This movement of pushing the button 393 is all that is required to start the grinding cycle and the machine then functions automatically to successively rough grind a set of cam blanks, then true the wheel and finish grind the cam blanks while the cam blank supporting table is moved in the opposite direction. The solenoid 394 is connected to a clutch shifting lever 396 which is held in a neutral position between grinding operations by means of a spring pressed arrow 398 which engages a V-shaped groove 397. When the solenoid 394 is energized, the arrow point 398 rides up the side of the V-groove 397 until it rests on a flat horizontal surface. The clutch member 85 remains in engagement with the clutch member 87 to rotate the camshaft at a rough grinding speed while the table is being intermittently indexed toward the left, as viewed in Fig. 1, until the last cam has been ground. When the table traverses beyond the last cam on the camshaft to traverse the diamond across the operative face of the grinding wheel, the dog 399 on the dog bar 95 engages the lower end of the clutch lever 396 and continued movement of the table throws the clutch member 85 out of engagement with the clutch teeth 87 and into engagement with the clutch teeth 86 to rotate the work at a slower or finish grinding speed. The clutch member 85 remains in engagement with the clutch member 86 to rotate the work at the finish grinding speed while the table is intermittently indexed to finish grind successive cams while the table is moving in a direction toward the right, as viewed in Fig. 1, until the table indexes beyond the first cam on the camshaft when a dog 400 on the dog bar 95 engages the lower end of the lever 396 and throws the clutch out of engagement to stop the work rotation.

At the end of the grinding operation, during the unloading of the finished piece of work and the loading of a new piece of work into the machine as well as during truing of the grinding wheel, it is desirable that the main control valve 345 be held positively against endwise movement so that in case of slippage of the parts or rotation of the cam, the valve could not operate to start a grinding cycle. To accomplish this result, a lever 401 is pivotally mounted on a shaft 402 and has its lower end engaging an adjustable stud 403 on the end of a rod 404 which is connected to the upper end of the rock arm 379 by means of a pin 405 riding in a slot 406. The upper end of the lever 401 is provided with a projection 407 which is arranged to be engaged by a surface on a dog 408. The surface on dog 408 holds the lever 401 from the broken line position indicated in Fig. 23 into the full line position so as to hold roller 378 and the main control valve 345 in a forward position, as illustrated in Figs. 4 and 23, during the loading.

A similar arm 409 is connected to the other end of the rock shaft 402 so that when the table reaches the other end of its movement, namely, the truing position, the lever 409 will engage a surface on the truing dog 297 so as to hold the lever 379 and main control valve 345 in the desired position and prevent any forward movement of the grinding wheel or the rock bar during the truing operation.

It may be desirable at times to traverse the work table from one position on the master camshaft to another. This may be particularly true when the machine is being set up for a given operation. In such a case, it is desirable that a suitable means be provided so that the table may be quickly traversed without the necessity of going through the regular grinding cycle. This may be accomplished by means of a lever 410 which is pivotally connected to the lever 401 by means of a stud 411. During the normal movement of the table, the operator may at any time during the grinding cycle press the lever 410 downwardly so as to rock the lever 401 into the position illustrated in Figs. 23 and 24 so as to actuate the main control valve and cause a rearward movement of the grinding wheel and a traversing movement of the work table. This will permit the operator to index manually from one grinding position to the next.

The lever 410 is provided with a projecting arm 412 which is adapted to engage the left-hand upper yoked end of the lever 282. If the operator desires to stop the grinding cycle and return the table either to a truing position or to a starting position, the operator may first swing the lever 410 into the broken line position 410a, as indicated in Fig. 28, so as to rock the lever 282 into a position 282a, as indicated in Fig. 28, thereby moving the dog lever 275 into an inoperative position, as indicated in broken lines in Fig. 29, so that it is out of the path of the dogs 272. While the dog lever is in this position, the operator may then swing the handle 410 downwardly to shift the main control valve and stop the grinding cycle, return the grinding wheel to a rearward position, rock the bar to an inoperative position and start the traversing movement which will continue to either end of the table stroke, depending on the setting of the table traversing or indexing valve.

In order to permit a reciprocation of the table before truing or passing the diamond or truing tool 306 across the face of the grinding wheel, it is desirable to stop the rotation of the control cam during this movement so that upon resuming the finish grinding operation, the master cam will have its nose or high point in engagement with the follower roller so as to start a grinding cycle without loss of time. This is preferably accomplished by providing a yoked member 413 (Fig. 20) which is mounted on a shaft 414 and is arranged to move the movable clutch member 373 into and out of engagement with the clutch member 374.

It is desirable that this clutch member be disengaged, at the end of the grinding cycle and also during truing, automatically without attention on the part of the operator. To accomplish this result, adjustable clutch actuating dogs 415 are mounted on the front edge of the table 54. A roller 416 is mounted on the upper end of a spring pressed plunger 417. The lower end of the plunger 417 engages a rock arm 418 which is connected to the outer end of the shaft 414. As shown in Fig. 1, the roller is depressed by dogs 415 so as to hold the clutch member 373 out of engagement and thereby prevent rotation of the main control cam. As the table traverse starts, the roller 416 rides up the slope on the dogs 415 and allows the rock arm 418 and shaft 414 to rock in a clockwise direction so as to engage the clutch members 373 and 374 to start the rotation of the master or cycle control cam. Similarly, when the table 54 reaches the other end of its stroke and after the last cam has been rough ground, the roller 416 is depressed by the inclined surface on the dog 415 to rock the arm 418 and shaft 414 and thereby disengage the clutch member 373 so as to stop the rotation of the cycle control cam during the passing of the truing tool across the face of the grinding wheel, the surface of the dog 415 being of sufficient length to take care of the length of reciprocation during the truing movement.

In grinding long camshafts which are provided with center bearings necessitating relatively long traversing movements in indexing between the center cams, it may be desirable to provide a center clutch dog 415 to throw out the clutch and hold it during the traversing movement past the center bearing.

It may be desirable at times during the setting up of the machine or possibly during grinding to stop the cycle control cam during its cycle of movement. To accomplish this result, a manually operable lever 419 is pivotally mounted on a stud 420 and carries a cam member 421 which is arranged to engage and rock the arm 418. It will be readily apparent from the disclosure in Fig. 1 that when the lever 419 is raised to a vertical position, the cam 421 will contact with the upper surface of the arm 418, rock the shaft 414 in a counterclockwise direction and thereby disengage the clutch member 373 to stop the rotation of the cycle cam. Similarly, when the lever 419 is moved into the position as illustrated in Fig. 1, the clutch member will be disengaged and controlled automatically by the dogs 415.

*Mechanical feed of grinding wheel during truing*

After the last cam on the shaft has been rough ground, the grinding wheel is moved to an extreme rearward position for truing, that is, with the piston 172 in engagement with the rear end of the cylinder 170 which serves as a stop to limit the rearward movement of the wheel slide as well as to position the grinding wheel for truing. The work table 54 is then reciprocated to traverse the truing tool 306 across the face of the grinding wheel. During this truing movement, it is desirable that the grinding wheel be advanced so that a sufficient amount may be trued off to maintain the wheel face in the same relative position with relation to the mechanisms of the machine. This is preferably accomplished by a pawl and ratchet mechanism, such as shown in Figs. 1, 13, and 14. A ratchet wheel 424 is fixedly mounted to the hand wheel 167 and the pinion 164. A pawl 425 is carried by a rock arm 426 which is freely rotatable on the ratchet wheel hub 427. The lower end of the rock arm 426 is connected to a link 428 by a pin 429. The other end of the link 428 is connected by a pin 430 to a short link 431 which is carried on a stud 432. An arrow point member 433 is fixed on the stud 432 and is engaged by a cam surface 434 on a wheel feeding dog 435. The downward movement of the arrow point 433 rocks the links 431 and 428 and the arm 426 to actuate the pawl 425 and turn ratchet wheel 424 to cause an infeeding movement of the grinding wheel. A stop screw 436 is provided on the arm 426 to limit the movement of the rock arm in a counterclockwise direction and a spring 437 serves to normally maintain the stop screw 436 in engagement with a fixed abutment 438. The extent of movement of the ratchet pawl 425, and consequently the extent of feeding movement of the grinding wheel may be varied by adjustment of the screw 436.

*Operation of machine*

Figure 31:
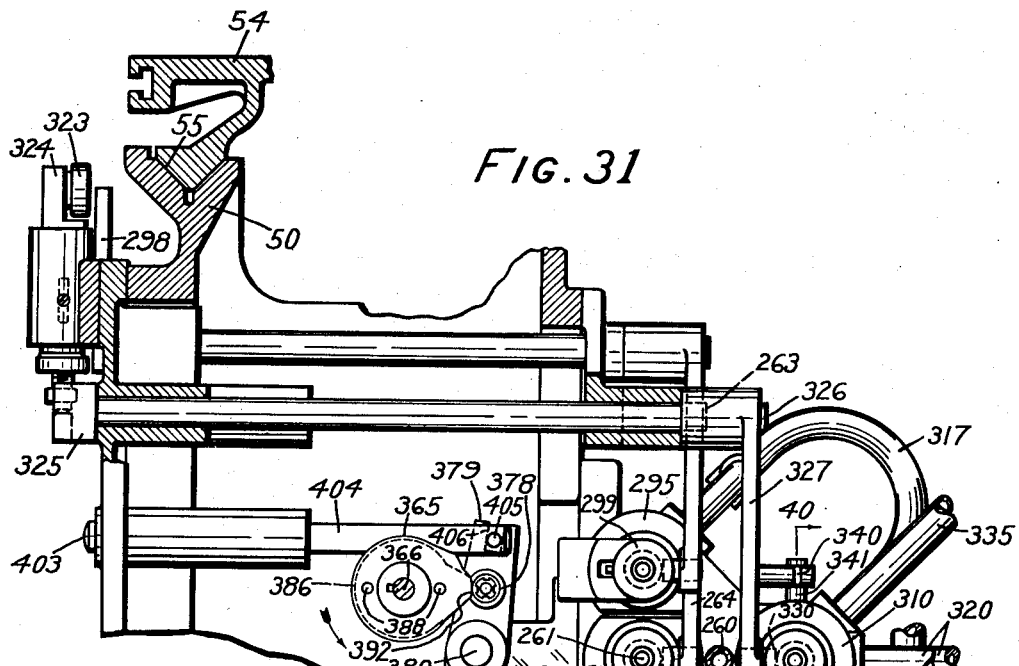
Fig. 31 is a fragmentary cross-sectional view, taken approximately on the line 31—31 of Fig. 7, showing the main control cam and valve in elevation, together with the valve actuating levers.
Figure 41:
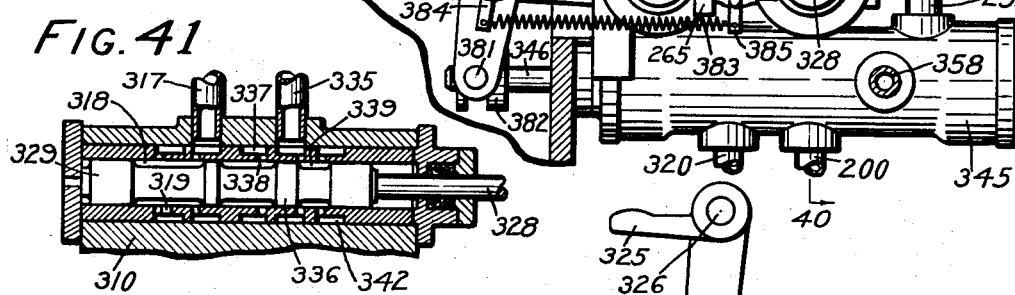
Fig. 41 is a fragmentary sectional view, taken approximately on the line 41—41, through the slow speed valve of Fig. 40.
Figure 40:
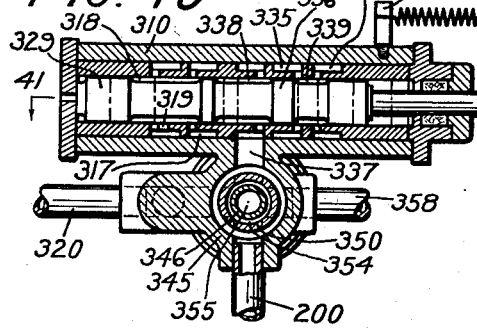
Fig. 40 is a fragmentary cross-sectional view, taken approximately on the line 40—40 of Fig. 31, showing the low speed valve for producing a slow speed during truing of the grinding wheel.
Figure 34:
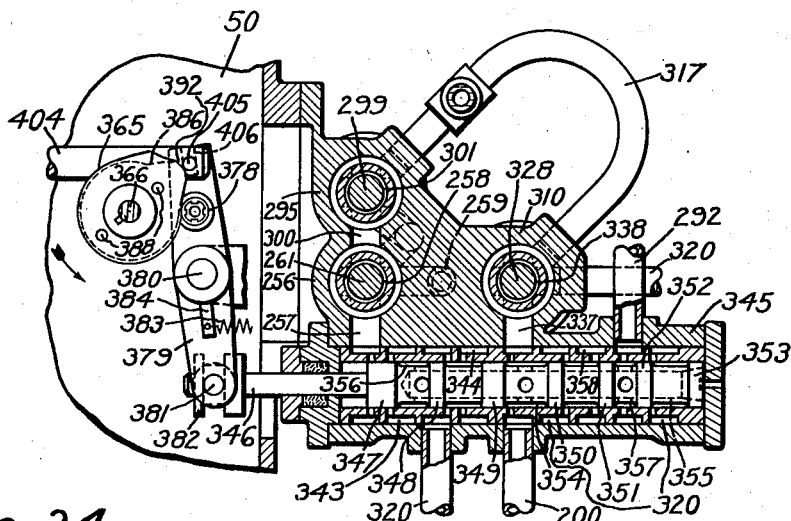
Fig. 34 is a fragmentary cross-sectional view through the main control valve, showing the main control cam, similar to the view shown in Fig. 23, but with the main control valve in a rearward position, admitting fluid to the feed cylinder to cause an infeeding movement of the grinding wheel.
Figure 35:
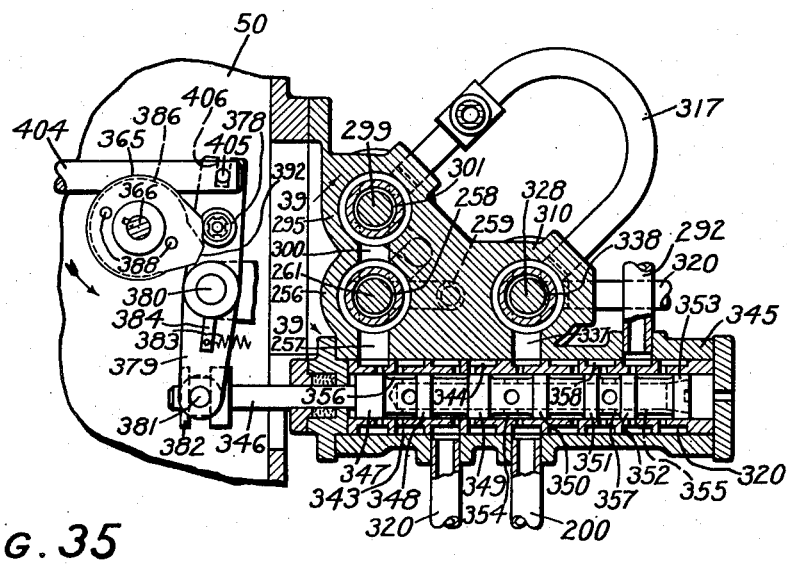
Fig. 35 is a similar fragmentary cross-sectional view, but with the main control cam and valve positioned as the cam approaches the end of the cycle on a product cam.

Assuming all adjustments of valves and controls to have been previously made, and the machine is ready for a loading or placing of a new piece of work into the machine with the parts in the positions as illustrated in Figs. 1 and 4, the operator places a camshaft 63 into the machine on centers and manually actuates the footstock center into an operative position. The operator then presses the button 393 which makes an electric circuit and energizes the solenoid 394 to actuate the clutch lever 396 and engage the clutch member 85 with clutch teeth 87 to start rotation of the camshaft at a relatively fast or rough grinding speed, and also energizes a solenoid 395 which operates to shift the manual control lever 262 and moves the valve stem 261 towards the right as viewed in Fig. 4 to admit fluid through the pipe 260 into the cylinder chamber 255 to index the table 54 (toward the left, Figs. 1 and 4) so that the first cam on the camshaft 63 is positioned in operative relation with the grinding wheel. During this initial movement of the table, the lever 401 moves out of engagement with the dog 408 and the roller 416 rides up the cam surface on dog 415 and allows the clutch member 373 to be engaged to start rotation of the cycle or main control cam 365. The cam 365 is in the position illustrated in Fig. 4, that is, with roller 378 on the nose or high point of the cam, when the control clutch is engaged. The cam starts rotating in a counterclockwise direction (Figs. 4, 23, 31) as illustrated by the arrow in the drawings and the roller 378 rides down the incline of the cam and spring 383 maintains the roller in contact with the cam and slides the main control valve 346 toward the right (Figs. 4 and 34). The traversing movement of the table continues until the first dog 272 strikes the dog lever 275 and rocks the pin 277 into engagement with the adjustable stop screw 280 and rocks the control lever 262 into the position illustrated in Figs. 4 and 9 with the arrow point 265 approaching the high point on the roller 266. This movement throws the valve 256 into a neutral position and stops the table movement. The cam 365 by this time has rotated a sufficient distance to allow the main control valve to move toward the right (Fig. 4) so that the valve piston 347 closes the pipe 257 and thereby prevents further fluid pressure passing into the table traversing or indexing mechanism. Valve piston 349 uncovers a pipe 344 and allows fluid to exhaust form cylinder 118 out through pipe 320 into the reservoir, allowing the rock bar 58 to swing the master cam 66 into engagement with the master cam roller 67. Upon further movement of the valve stem 346 toward the right (Fig. 4), the valve piston 351 moves a sufficient distance toward the rght to cut off fluid pressure from the pipe 358 and then valve piston 352 uncovers the pipe 292 so as to admit fluid under pressure to the cylinder 287 which operates to move the dog lever 275 rearwardly out of the path of the dog 272. At the same time, fluid under pressure passing through the pipe 292 enters a chamber 360 in the rear end of the valve 190 and moves the valve stem 191 toward the left as viewed in Fig. 4. This movement cuts off fluid pressure from the pipe 202 and permits fluid passing through the intake pipe 200 to pass through pipe 205 into the cylinder chamber 204 to start the forward infeeding movement of the grinding wheel. The roller 378 has by this time reached the concentric portion on cam 365 so that the cam holds the valve stem 346 in a feeding position. The wheel moves rapidly toward the work during the first part of its stroke until the screw 226 strikes the dog 225 which rocks the arm 220, moving the valve stem 191 toward the right (Figs. 4 and 11) so as to substantially cut off the exhaust of fluid through the pipe 202 and valve chamber 208. The wheel continues to move forward to grind the work at a slower speed, since fluid under pressure still passes through the pipe 205.

During this grinding feed, fluid exhausts from pipe 202 through pipe 207 and also may exhaust through pipe 209, needle valve 210 and pipe 211 into the reservoir. By adjustment of the valve 210, the feed of the wheel may be varied. The forward feeding movement of the grinding wheel continues until the sleeve 188 engages the gauge block 187 so as to positively limit the forward feeding movement of the wheel, when the cam has been rough ground.

By this time, the cam has rotated to a sufficient angle so that the roller 378 starts to ride up the first rise on the cam. This movement rocks the lever 379 and starts movement of the valve stem 346 toward the left, as viewed in Fig. 4. This movement first operates to move the piston 352 to cover the pipe 292 and then opens the pipe 358 so as to admit fluid to the chamber 359 in feed valve 190 which shifts the valve stem 191 toward the right (Fig. 4) so as to admit fluid pressure through the pipe 202 into cylinder chamber 203 to cause a rearward feeding movement of the grinding wheel. Then the piston 349 moves a sufficient distance toward the left to cover the pipe 344 and the piston 347 uncovers a port 343 and admits fluid under pressure through pipe 344 and a ball check valve into cylinder 118 to rock the lever 121 and also the bar 58 to move the master cam 66 into an inoperative position away from the master cam roller 67. The valve piston 347 then uncovers the pipe 257 to admit fluid to the table traverse or index valve 256. Previously, when fluid pressure was admitted to the cylinder 287 to move the dog lever 275 to an inoperative position, the released tension of the spring pressed roller 266 acting upon the arrow point 265 shifts the lever 262 in a counterclockwise direction so that when fluid under pressure passes through the pipe 257, it passes outwardly through a pipe 260 into the cylinder chamber 255 to start a second traversing or indexing movement of the table 54.

During this indexing movement of the table 54, a dog 99 on the bar 95 engages the star wheel 100 and turns the star wheel through a partial turn which operates through gears 102, 103, 104 and rack 105 to index the master cam roller 67 into operative relation with the next master cam 66. The table traversing and indexing of the master cam roller take place during the time when the follower roller 378 is on the nose 392 of the cam 365. The length of the nose 392 may be lengthened by adjustment of the auxiliary cam 386 so that the nose 391 continues the nose 392. This adjustment is made so that there is sufficient time to traverse between the greatest distance between cams on the product camshaft. By the time the master cam 365 has rotated so that the roller 378 has passed across the nose of the cam and has started down the incline, the table has indexed to its next grinding position and the master cam roller has indexed into alignment with the next master cam. The cycle of operation continues the same as previously described to grind the second and succeeding cams on the product camshaft.

When the table indexes from the last cam on the camshaft, the grinding wheel moves rearwardly to its extreme rearward position with the piston 172 in engagement with the rear end of the cylinder 170. The cam surface on the dog 415 depresses the spring pressed roller 416, rocking the lever 418 and shaft 414 to disengage the clutch member 373 so as to stop the rotation of the cycle cam. The table moves toward the left to pass the diamond or truing tool 306 across the operative face of the grinding wheel. This movement continues until the truing dog 297 engages the pilot valve lever 298 and shifts the pilot valve against the tension of the equalizing spring 296 toward the right (Figs. 5 and 10) so as to admit fluid through the pipe 302 into a chamber 303 in the table traverse or indexing valve 256. This movement shifts the table traverse or indexing valve stem 261 toward the left (Fig. 5) to reverse the direction of movement of the table, at the same time forcing the arrow point 265 over the high point of the roller 266 (Fig. 5) and admitting fluid through the pipe 259 into the cylinder chamber 254 to cause a movement of the table toward the right (Figs. 1, 4, and 5). The table continues to move toward the right to pass the truing tool 306 across the face of the wheel.

During the traverse of the table while truing the grinding wheel, the arm 409 engages a surface on dog 297 so as to hold the rod 404 and arm 379 to maintain the main control valve in a traversing position and prevent any feeding movement of the grinding wheel. As the table starts the traversing movement, the feed dog 435 engages the arrow point 433 and actuates the pawl 425 to mechanically rotate the feed screw and adjust the position of the grinding wheel relative to the hydraulic feeding mechanism so that when the diamond passes across the face of the wheel, the worn part of the wheel will be trued away so as to present a fresh grinding surface. The table continues movement after the second pass of the diamond across the face of the wheel and the roller 416 rides up the cam face on dog 415, allowing the arm 418 and shaft 414 to rock and engage the master cam control clutch.

At the end of the truing stroke, the work rotation clutch lever 396 engages a dog 399 which shifts the clutch member 85 so that it engages the clutch teeth 86 to rotate the camshaft at a slower or finish grinding speed. The table continues its movement towards the right, as viewed in Fig. 1, until the dog lever 275 engages the last dog 272 and rocks the dog lever in a clockwise direction so that the pin 277 engages the stop screw 279 (Fig. 9) to rock the lever 262 from position 262a in a counterclockwise direction toward a central position. This movement shifts the valve 256 to a neutral position to stop the table traversing or indexing movement. The main control cam 365 then functions to control the finish grinding of the last cam on the camshaft.

During the truing operation, when the pilot valve is actuated by the pilot valve lever 298 to shift the table indexing valve to a reversed position, a rod 440 connected by a pin 441 to the lower end of the lever 262 rocks a link 442 and shaft 443 which in turn rocks a link 444 and a link 445 on the rear of the machine base to rock the shaft 236 so as to shift the gauge block 187 which is formed with two portions, one serving as a rough grinding gauge and the other a finish grinding gauge 189 to bring the finish grinding section into operative relation with the sleeve 188 so that during the finish grinding of successive cams on the camshaft, the finish grinding gauge 189 will limit the forward movement of the grinding wheel. Successive cams are finish ground as the table is indexed automatically in a direction toward the right (Fig. 1) until the first cam on the camshaft has been finish ground and the table indexes to an inoperative or loading position until the dog 408 engages the dog lever 275 and shifts the table traverse valve 256 to a neutral position to stop the table traverse. At the same time, projection 407 of the lever 401 is engaged by a surface on dog 408 so as to hold the main control valve in the position as illustrated in Figs. 4 and 23. At the same time the table 54 is stopped, a dog 400 on the bar 95 rocks the clutch actuating lever 396 to shift the clutch member 85 to a neutral position to stop the work rotation. The operator may then remove the finish ground camshaft and place a new shaft in position, press the push button 393 and the machine will automatically go through a cycle of rough grinding successively each cam on the shaft, then truing the grinding wheel and finish grinding successively each cam on the shaft and stopping at the end of the complete cycle of operation.

It will be understood that various features of this machine as herein described may be employed independently of others and in grinding machines adapted for other uses besides that of grinding cams, such as for grinding cylindrical pieces of multiple diameters or the pins of a crankshaft. Hence, the claims are to be interpreted accordingly.

Having thus described the invention, what is claimed as new and desired to secure by Letters Patent is:

1. A cam grinding machine comprising a rotatable grinding wheel, means to rotate a camshaft having a plurality of spaced cams thereon in operative relation to said wheel, means to intermittently traverse the shaft in one direction and successively position said cams opposite to the grinding wheel, means to automatically feed the grinding wheel toward the camshaft for grinding said cams, and means actuated automatically after all of the cams have been traversed past the wheel to reverse the direction of traverse and intermittently and successively position said cams again opposite to the grinding wheel for a second grinding operation.

2. A cam grinding machine for grinding a camshaft having a plurality of spaced cams thereon according to claim 1 in which the cams are successively rough ground while the shaft is traversed in one direction and are successively finish ground while the shaft is traversed in the opposite direction and an automatically actuated mechanism to stop the machine after the finish grinding is completed.

3. A cam grinding machine comprising a base, a rotatable grinding wheel, a transversely movable wheel slide to support said wheel, a longitudinally movable work table on said base, means to rotatably support a camshaft having a plurality of spaced cams thereon, means to rotate said camshaft, means to intermittently traverse said table in one direction for a rough grinding operation and successively position said cams opposite to the grinding wheel, means to automatically feed the grinding wheel toward and from the camshaft to rough grind said cams, means for truing the wheel automatically after the completion of the rough grinding operation and means acting after the truing operation to reverse the direction of table traverse and cause the cams to be positioned successively opposite the wheel for a finish grinding operation.

4. A grinding machine comprising a base, a rotatable grinding wheel, a wheel slide arranged to support said wheel for a transverse movement on said base, a longitudinally movable work table on said base, means to rotatably support a work piece having a plurality of spaced portions to be ground, means to intermittently traverse said table and successively position said portions opposite to the grinding wheel, means to automatically feed the grinding wheel into the work to rough grind each of said blanks, a grinding wheel truing tool mounted on said table and means actuated automatically after rough grinding all of the blanks to reciprocate said table to true the wheel face.

5. A cam grinding machine comprising a base, a rotatable grinding wheel, a transversely movable wheel slide to support said wheel, a longitudinally movable work table on said base, means to rotatably support a camshaft having a plurality of spaced cams thereon, means to rotate said camshaft, means to intermittently traverse said table in one direction for a rough grinding operation and successively position said cams opposite to the grinding wheel, means to automatically feed the grinding wheel toward and from the camshaft to rough grind said cams, a grinding wheel truing tool fixedly mounted on the table, means actuated automatically after rough grinding to reciprocate the truing tool slowly across the operative face of the grinding wheel, means to automatically feed the wheel towards said truing tool and means to reverse the direction of said intermittent traversing movement to successively finish grind the spaced cams.

6. A cam grinding machine comprising a base, a rotatable grinding wheel, a traversely movable wheel slide to support said wheel, a longitudinally movable work table on said base, means to rotatably support a camshaft having a plurality of spaced cams thereon, means including a two-speed driving mechanism to rotate said camshaft, means to intermittently traverse said table and successively position said cams opposite to the grinding wheel, means to automatically feed the grinding wheel toward and from the camshaft to rough grind said cams, a grinding wheel truing tool fixedly mounted on the table, means actuated automatically after rough grinding to reciprocate the truing tool slowly across the operative face of the grinding wheel, means to automatically feed the wheel towards said truing tool, means automatically actuated by the table movement to change the speed of rotation of the work to a finish grinding speed, and means to reverse the direction of said intermittent traversing movement to successively finish grind the spaced cams.

7. An automatic cam grinding machine comprising a rotatable grinding wheel, a transversely movable slide supporting said wheel, a longitudinally movable work support arranged to support a camshaft having a plurality of spaced cam blanks, a set of master cams and a follower arranged to control movement of said work support toward and from the grinding wheel to produce the desired contours on the cam blank, means to rotate said cam and said camshaft, means to intermittently traverse said work support to position successive cams in operative relation with the grinding wheel, a feeding mechanism arranged to automatically feed the grinding wheel into the work to rough grind the cam blank while the work support is intermittently traversed in one direction, a truing tool rigidly mounted on said table, means to automatically reciprocate the work support at the end of the rough grinding stroke to slowly traverse the truing tool across the face of the grinding wheel to true the same, and means to automatically reverse the direction of travel of the work support to intermittently and successively finish grind said cams while the work support is moving in the opposite direction.

8. A hydraulically operated grinding machine comprising a rotatable grinding wheel, a transversely movable slide to support said wheel, a longitudinally traversable work table, a fluid pressure operated mechanism to traverse said table in either direction, means including a fluid pressure operated mechanism to move the wheel toward and from the work to grind the same, a power operated wheel spindle reciprocating mechanism, a fluid pressure cylinder to stop said wheel spindle reciprocation while truing the grinding wheel, and a fluid pressure system including a main control valve arranged to control the admission of fluid to said wheel slide, work table, and wheel spindle reciprocating cylinders.

9. A hydraulically operated grinding machine comprising a rotatable grinding wheel, a transversely movable slide to support said wheel, a longitudinally traversable work table, a fluid pressure operated mechanism to traverse said table in either direction, means including a fluid pressure operated mechanism to move the wheel toward and from the work to grind the same, a truing tool mounted on the table, and a speed control valve in the fluid pressure system which is operated in timed relation with the table movement when it has reached the end of its normal grinding traverse, to cause the table to reciprocate at a slower speed and move the truing tool across the face of the grinding wheel.

10. A grinding machine comprising a rotatable grinding wheel, a transversely movable slide therefor, a longitudinally movable work supporting table, a head and footstock thereon arranged to support a work piece having a plurality of spaced blanks, means to rotate the work, means to automatically traverse said table intermittently to position said blanks in operative relation with the grinding wheel, means to feed said wheel automatically toward the work to grind the same, a stepped gauge block arranged to limit the forward feeding movement of the grinding wheel having a portion arranged to limit the rough grinding operation, means to automatically reverse the traversing movement of the table after each blank has been rough ground and to traverse the table in the reverse direction to finish grind the cam blank, and automatically actuated mechanism to shift said gauge block to move the finish gauge portion into operative relation with the feeding mechanism to limit the forward movement of the grinding wheel.

11. A grinding machine comprising a rotatable grinding wheel, a transversely movable slide therefor, a longitudinally movable work supporting table, a headstock and footstock thereon to support a work piece, means including a clutch to rotate the work, a solenoid to actuate said clutch, fluid pressure means including a valve to traverse said table, a solenoid to actuate said valve, and an electric circuit including a push button which is operatively connected to energize said solenoids to simultaneously start the work rotation and the table traverse.

12. In a grinding machine having a transversely movable grinding wheel slide, a rotatable grinding wheel on said slide, a longitudinally movable work table, fluid pressure means to feed the grinding wheel toward the work table, a truing tool on said table arranged to true the wheel when it is in its rearward position, means to reciprocate said table during the truing operation, and means automatically actuated to feed the grinding wheel relative to the hydraulic means to true the wheel so that grinding may be resumed without readjusting the wheel feeding mechanism.

13. In a grinding machine, a rotatable grinding wheel, a transversely movable wheel slide to support said wheel, a longitudinally movable work table, a truing tool fixedly mounted on said table and arranged to true the wheel when in its rearward position, a hydraulic mechanism to feed said grinding wheel toward and from the work table, automatic means for reciprocating the diamond past the grinding wheel, and means actuated by said reciprocating movement to feed the grinding wheel into the truing tool so that grinding may be resumed without readjusting the wheel feeding mechanism.

14. A grinding machine comprising a rotatable grinding wheel, a transversely movable wheel slide to support said wheel, a longitudinally movable work table, means to feed the grinding wheel towards and from the table, means to traverse the table in either direction, means to reciprocate the grinding wheel axially relative to the slide during grinding and means actuated automatically to stop the reciprocation of the grinding wheel.

15. A grinding machine comprising a rotatable grinding wheel, a transversely movable wheel slide to support said wheel, a longitudinally movable work table, means to feed the grinding wheel towards and from the work, means to traverse the table in either direction, a truing tool arranged to true the operative face of the grinding wheel, means to reciprocate the grinding wheel axially relative to the slide during grinding, and means actuated automatically to stop the reciprocation of the grinding wheel when the truing tool is moved into operative relation with the wheel.

16. A grinding machine comprising a rotatable grinding wheel, a transversely movable wheel slide to support said wheel, a longitudinally movable work table, means to feed the grinding wheel towards and from the table, means to traverse the table in either direction, a truing tool on said table for truing the grinding wheel, means to reciprocate the grinding wheel axially relative to the slide during grinding and means actuated automatically to stop the reciprocation of the grinding wheel when the table is traversed to move the truing tool into operative relation with the grinding wheel.

17. A grinding machine comprising a rotatable grinding wheel, a transversely movable wheel slide to support said wheel, a longitudinally movable work supporting table, means to feed the grinding wheel towards and from the table, means to traverse the table in either direction, a truing tool on said table for truing the grinding wheel, means to reciprocate the grinding wheel relative to the slide, means to prevent reciprocation of the wheel when the truing tool is in an operative position and means actuated automatically to start reciprocation of said wheel when the table is traversed into a grinding position.

18. A cam grinding machine comprising a rotatable grinding wheel, a transversely movable slide to support said wheel, support for a camshaft having a plurality of spaced cam blanks thereon which is pivotally mounted on said table, a set of master cams and a follower interposed between said support and the table to rock said support so as to produce the desired contour on said blanks, a fluid pressure operated means for traversing said table to position cam blanks opposite the grinding wheel, a fluid pressure mechanism arranged to feed the grinding wheel into the work to grind the same, a fluid pressure mechanism to rock said support to an inoperative position after grinding and while the table is traversing, a grinding wheel spindle reciprocating mechanism, a truing tool fixed on said table, fluid pressure means to stop said spindle reciprocation during the truing operation, a main control valve operatively connected to control the table traverse, the wheel feed, the rocking of the camshaft support, the stopping of the spindle reciprocation during truing, and the reciprocation of the truing tool, and a main control cam arranged to actuate said main control valve to govern the cycle of operation.

19. A cam grinding machine comprising a base, a rotatable grinding wheel, a transversely movable wheel slide to support said wheel, a longitudinally movable work table on said base, means to rotatably support a camshaft having a plurality of spaced cams thereon, means to rotate said camshaft, means to intermittently traverse said table in one direction to bring successive cams into position opposite the grinding wheel, means to automatically feed the wheel toward and from the camshaft to grind said cams, and means for automatically truing the grinding wheel after all of said cams have been ground.

20. A cam grinding machine comprising a base, a rotatable grinding wheel, a wheel slide arranged to support said wheel for a transverse movement on said base, a longitudinally movable work table on said base, means to rotatably support a work piece having a plurality of spaced portions to be ground, means to traverse said table and position said portions opposite to the grinding wheel, means to automatically feed the grinding wheel into the work to grind each of said blanks, a grinding wheel truing tool, and means automatically actuated after all of said blanks have been ground to reciprocate said table to true the wheel face.

21. A grinding machine comprising a base, a rotatable grinding wheel, a wheel slide arranged to support said wheel for a transverse movement on said base, a longitudinally movable work table on said base, means to rotatably support a work piece having a plurality of spaced portions to be ground, means to intermittently traverse said table and successively position said portions opposite to the grinding wheel, means to automatically feed the grinding wheel into the work to grind each of said blanks, a grinding wheel truing tool mounted on said table, and means automatically actuated after grinding all of the blanks to reciprocate said table to true the wheel face.

22. A grinding machine comprising a rotatable grinding wheel, a transversely movable wheel slide to support said wheel, a longitudinally movable work table, means to feed the grinding wheel towards and from the table, means to traverse the table in either direction, means to reciprocate the grinding wheel axially relative to the slide during grinding, and means actuated when said table traverses into a predetermined position to stop the reciprocation of the grinding wheel.

ALBERT G. BELDEN.
HERBERT A. SILVEN.